(12) United States Patent
Scussat et al.

(10) Patent No.: US 8,860,800 B2
(45) Date of Patent: Oct. 14, 2014

(54) BORESIGHT ALIGNMENT STATION

(75) Inventors: Marco A. Scussat, Goleta, CA (US);
Richard M. Goeden, Goleta, CA (US);
Jeffrey S. Scott, Goleta, CA (US);
Richard G. Lane, Goleta, CA (US);
Gary B. Hughes, Santa Maria, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 663 days.

(21) Appl. No.: 13/077,676

(22) Filed: Mar. 31, 2011

(65) Prior Publication Data
US 2012/0249863 A1    Oct. 4, 2012

(51) Int. Cl.
*H04N 9/47* (2006.01)
*H04N 17/00* (2006.01)
*H04N 5/225* (2006.01)
*H04N 5/33* (2006.01)

(52) U.S. Cl.
CPC ............... *H04N 5/33* (2013.01); *H04N 17/002* (2013.01); *H04N 5/332* (2013.01)
USPC ........................... 348/95; 348/180; 348/218.1

(58) Field of Classification Search
USPC ...................................... 248/187.1
See application file for complete search history.

(56) References Cited

U.S. PATENT DOCUMENTS

| | | | |
|---|---|---|---|
| 3,782,832 A | 1/1974 | Hacskaylo | |
| 3,787,693 A | 1/1974 | Stone | |
| 4,168,429 A | 9/1979 | Lough | |
| 4,367,949 A | 1/1983 | Lavering | |
| 4,530,162 A | 7/1985 | Forrest et al. | |
| 4,569,591 A | 2/1986 | Ford et al. | |
| 4,729,075 A * | 3/1988 | Brass | 362/223 |
| 4,879,814 A | 11/1989 | Wallace et al. | |
| 4,917,490 A | 4/1990 | Schaffer, Jr. et al. | |
| 5,001,836 A | 3/1991 | Cameron et al. | |
| 5,025,149 A | 6/1991 | Hatfield et al. | |
| 5,047,638 A | 9/1991 | Cameron et al. | |
| 5,142,204 A * | 8/1992 | Gornati et al. | 315/364 |
| 5,410,398 A | 4/1995 | Appert et al. | |
| 5,596,185 A * | 1/1997 | Bross et al. | 250/208.1 |
| 5,672,872 A | 9/1997 | Wu et al. | |

(Continued)

FOREIGN PATENT DOCUMENTS

WO    WO 2010/121354 A1    10/2010

OTHER PUBLICATIONS

Williams, N. et al., Automatic Image Alignment for 3D Environment Modeling, Proceedings of the XVII Brazialian Symposium on Computer Graphics and Image Proceesing, IEEE Computer Society, 2004 (8 pages).

(Continued)

*Primary Examiner* — Aung S Moe
*Assistant Examiner* — Euel Cowan
(74) *Attorney, Agent, or Firm* — Haynes and Boone, LLP

(57) ABSTRACT

A boresight alignment system facilitates aligning a plurality of cameras and/or images of the cameras with respect to one another. The system may have a mount configured to facilitate attachment of a bezel containing a plurality of cameras to the mount. The system may have a plurality of targets and each target may be configured to provide light of at least two different wavelengths and/or ranges of wavelengths. One or more baffles may be disposed optically between the mount and the target assembly to inhibit stray light from being incident upon the cameras.

21 Claims, 21 Drawing Sheets

(56) References Cited

U.S. PATENT DOCUMENTS

| | | | |
|---|---|---|---|
| 6,072,572 A * | 6/2000 | Hatfield et al. | 356/152.3 |
| 6,094,269 A * | 7/2000 | Ben-Dove et al. | 356/623 |
| 6,166,809 A * | 12/2000 | Pettersen et al. | 356/612 |
| 6,211,951 B1 | 4/2001 | Guch, Jr. | |
| 6,236,737 B1 * | 5/2001 | Gregson et al. | 382/103 |
| D518,498 S | 4/2006 | Reed et al. | |
| 7,307,793 B2 | 12/2007 | Ottney et al. | |
| 7,325,354 B2 | 2/2008 | Grauslys et al. | |
| 7,333,270 B1 | 2/2008 | Pochapsky et al. | |
| 7,369,302 B2 | 5/2008 | Gaber | |
| 7,411,194 B1 | 8/2008 | Everett et al. | |
| D586,874 S | 2/2009 | Moody et al. | |
| 8,390,677 B1 * | 3/2013 | Said | 348/51 |
| 2007/0279514 A1 * | 12/2007 | Mitsumine et al. | 348/336 |
| 2010/0220218 A1 * | 9/2010 | Narabu | 348/234 |
| 2012/0121128 A1 * | 5/2012 | Lawrence et al. | 382/103 |

OTHER PUBLICATIONS

Heipke et al., The OEEPE Test on Integrated Sensor Orientation—Results of Phase I, Photogrammetic Week 01, D. Fritsch & R. Spiller, Eds., Wichmann Verlag, Heidelberg 2001, (10 pages).

* cited by examiner

BORESIGHT ALIGNMENT STATION

TECHNICAL FIELD

One or more embodiments of the invention relate generally to cameras and, more particularly, for example, to a system and method for aligning images from a plurality of cameras with respect to one another.

BACKGROUND

In many applications, there may be a need to combine the outputs of a plurality of different cameras, often characterized by different spectral bands, to form a blended video stream. For example, the blended video stream from a visible light camera and an infrared (IR) camera may contain more useful information than the original video stream from either camera alone. However, in order to better facilitate the accurate combining of the outputs of a plurality of cameras, the images provided thereby should be in alignment with respect to one another.

As a result, there is a need for a system and method for aligning a plurality of cameras and/or the images provided thereby with respect to one another. More particularly, there is a need to facilitate the quick and accurate alignment of the pixels of one camera with respect to the pixels of another camera such that corresponding pixels in each camera are pointing to the same object in the viewing field.

SUMMARY

In accordance with an embodiment, a system may include a mount configured to facilitate attachment of a bezel thereto. The bezel may have a plurality of cameras attached thereto. A target assembly may comprise a plurality of targets, wherein each of the targets may be configured to provide light of one or more different wavelengths and/or ranges of wavelengths, e.g., spectral bands. A baffle assembly may be disposed optically between the mount and the target assembly to inhibit stray light from being incident upon the targets and/or upon the cameras.

In accordance with an embodiment, a target assembly may include a plurality of targets. Each target may be configured to provide light of one or more different wavelengths and/or ranges of wavelengths by radiating light of one wavelength or within one range of wavelengths and by reflecting light of another wavelength or within another range of wavelengths.

In accordance with an embodiment, a method may include attaching a bezel containing a plurality of cameras to a mount. A plurality of targets may be heated to radiate infrared radiation therefrom. The targets may be illuminated with a light source, e.g. a visible light source. Other techniques may enable the target to also radiate in other spectral band beyond visible and IR when necessary. Stray light may be inhibited from being incident upon the targets and/or cameras via the use of a baffle assembly. The cameras and/or their images may be aligned such that desired, corresponding, and/or predetermined pixels from each camera sense the targets, e.g. such that the images from the cameras are aligned with respect to one another.

The scope of the invention is defined by the claims, which are incorporated into this Summary by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

DETAILED DESCRIPTION

Figure 1:
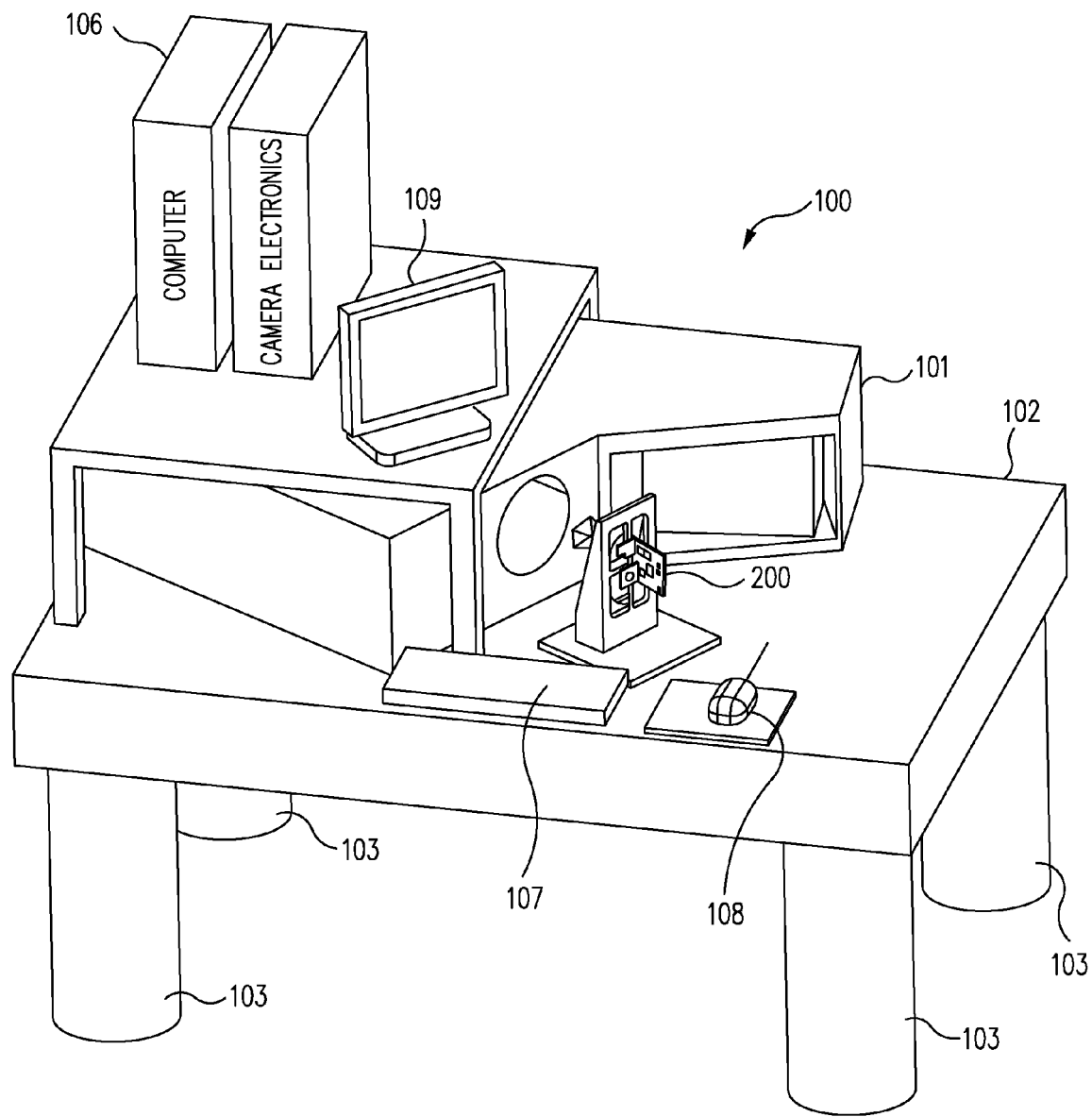
FIG. 1 shows a perspective view illustrating a boresight alignment station, in accordance with an embodiment of the invention.

Embodiments of the invention and their advantages are best understood by referring to the detailed description that follows. It should be appreciated that like reference numerals are used to identify like elements illustrated in one or more of the figures.

According to various embodiments, methods and systems facilitate the alignment of images from a plurality of cameras with respect to one another. For example, a boresight alignment station may provide targets for the optical boresight alignment of the images of two separate cameras, e.g., a visible light camera and an infrared camera, with respect to one another.

Thus, the boresight alignment station may allow images from the two cameras to be overlaid with respect to one another, such as to form a blended video image. Such alignment of the images may better facilitate viewing of the images. For example, such alignment of the images may better facilitate the making of a blended video stream that may be used for enhanced low light viewing by automobile drivers, aircraft pilots, and the like.

The boresight alignment station may facilitate the alignment of the images of any desired number of cameras. For example, the boresight alignment station may facilitate the alignment of the images of two, three, four, five, six, or more cameras. The cameras may operate within the same range of wavelengths or within different ranges of wavelengths. The cameras may operate within any desired range or ranges of wavelengths.

Alignment generally is performed such that desired, corresponding, and/or predetermined pixels of the images of the cameras are aligned, e.g., are co-incident, with one another on a blended image or combined frame. Such alignment may be obtained by electronic alignment of the images, by mechanical alignment of the cameras, or by a combination of such electronic alignment and mechanical alignment.

For example, two cameras may be mechanically aligned in rotation and then electronically aligned in x-position, y-position, x-scaling, and y-scaling. Rotation may be corrected by manually rotating at least one of the cameras under the direction of a computer, for instance while viewing a blended image of the target scene on a monitor. The x-position, y-position, x-scaling, and y-scaling corrections may be determined by the computer and the corrections may be made automatically, e.g., via the computer without requiring manual adjustment or repositioning of the cameras.

The targets may be heated to provide variable, independent, temperature controlled infrared targets that also serve as visible light targets. The targets may serve as visible light targets by reflecting visible light from a visible light source off of the targets. The infrared energy and the visible light from the targets may pass through baffles having cutouts formed therein. The cutouts may define the shapes of images used in the boresight alignment process.

FIG. 1 shows a perspective view illustrating a boresight alignment station 100, in accordance with an embodiment of the invention. The boresight alignment station 100 may comprise a target and collimator assembly 101 that is disposed upon an optical bench 102. The optical bench 102 may have vibration isolation legs 103.

A computer 106 may facilitate control of a boresight alignment process, as described herein. A keyboard 107, a mouse 108, and/or a monitor 109 may provide a user interface to the computer 106. The computer may be equipped with digital frame-grabbers and associated cabling that allow real-time acquisition and display of video and images of the target scene as viewed by the cameras that are to be aligned.

The boresight alignment station 100 may be used to align images provided by two or more cameras. For example, the boresight alignment station 100 may be used to align images from two or more cameras mounted in a bezel 200. The bezel 200 may be attached to the optical bench 102, as discussed herein.

Figure 2:
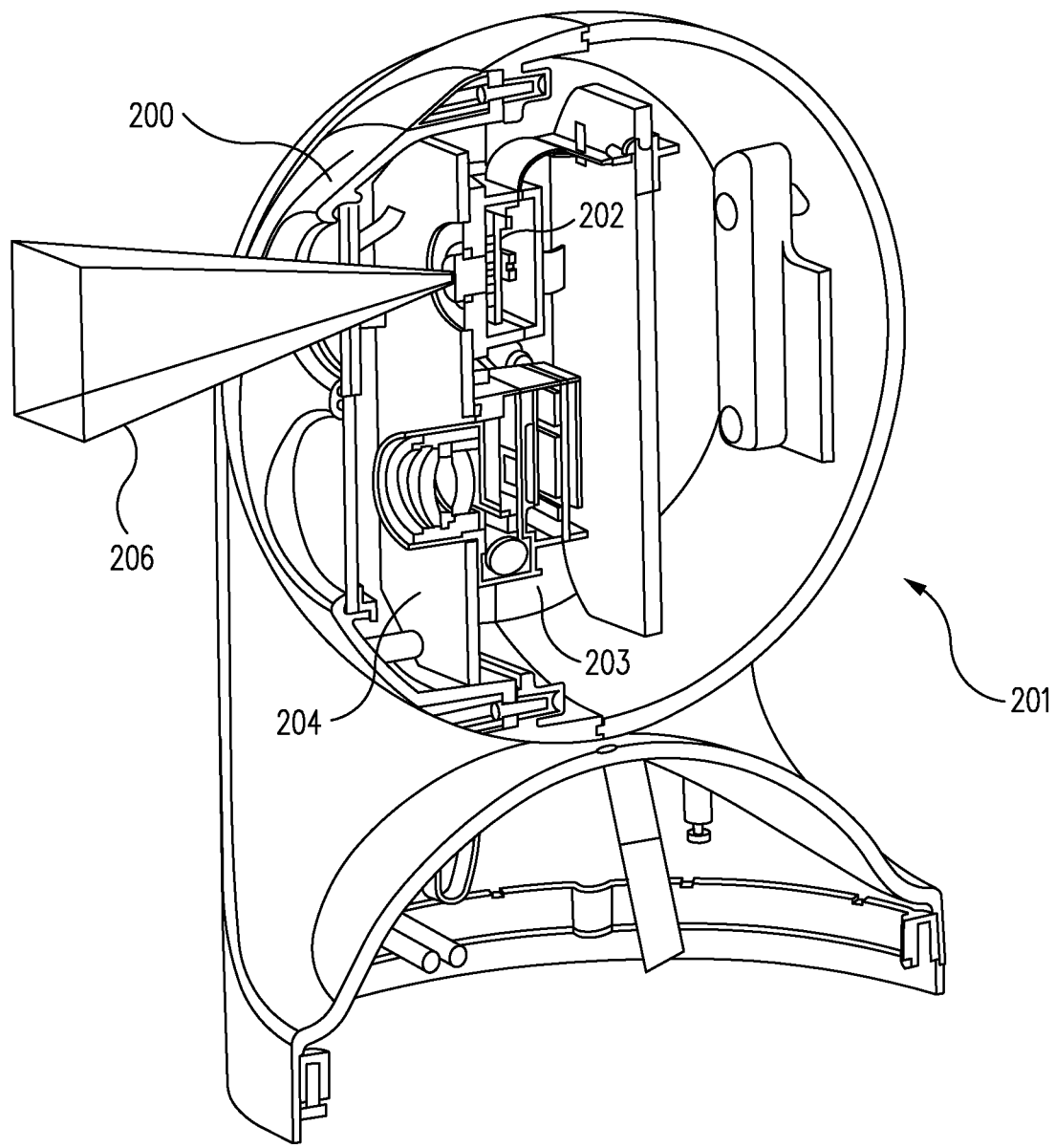
FIG. 2 shows a cross-sectional perspective view illustrating a camera assembly, in accordance with an embodiment of the invention.

FIG. 2 shows a cross-sectional perspective view illustrating the bezel 200 mounted in a camera assembly 201, in accordance with an embodiment of the invention. The camera assembly 201 may be used on aircraft, such as helicopters, to provide enhanced low light vision or night vision, for example. The camera assembly 201 may be used for any desired reason, particularly in applications where the ability to provide a blended image is advantageous.

The bezel 200 may comprise, for example, a visible light camera 202 and an infrared camera 203. The infrared camera 203 may be a long wavelength infrared camera (LWIR), for example. The outputs of the visible light camera 202 and the infrared camera 203 may be blended to facilitate enhanced night vision, for example. The bezel 200 may be removed from the camera assembly 201 to facilitate alignment of the two cameras thereof using the boresight alignment station 100.

The two cameras of the bezel 200 may be identical or similar cameras. The two cameras of the bezel 200 may be different cameras. For example, the two cameras of the bezel 200 may image two different wavelengths or ranges of wavelengths of light. The two cameras may also have the same sensor format in terms of the number of rows and columns of pixels, or they may have different sensor formats.

As an example implementation, the visible light camera 202 and the infrared camera 203 may be mounted close to one another and may be mounted to a common plate 204. Mounting the visible light camera 202 and the infrared camera 203 close to one another provides the visible light camera 202 and the infrared camera 203 with approximately the same field of view (such as field of view 206 of the visible light camera 202).

The visible light camera 202 and the infrared camera 203 may have different fields of view. For example, the visible light camera 202 may have a larger field of view as compared to the infrared camera 203. The boresight alignment procedure may, to some extent, accommodate such differing fields of view.

Mounting the visible light camera 202 and the infrared camera 203 to the common plate 204 provides some degree of alignment there between. However, such mounting does not assure desired translational alignment of the images in the x-y plane, desired scaling of the images in the x-y plane, and desired rotational alignment of the images.

Desired rotational alignment of the two images may be accomplished by manually rotating at least one of the visible light camera 202 and the infrared camera 203. Thus, a mechanical adjustment may be provided to facilitate rotation of the visible light camera 202 and/or the infrared light camera 203. Desired rotational alignment can also be accomplished by measuring rotational error using the boresight alignment station and correcting the error electronically in the video data processing stream.

Desired translational alignment in the x-y plane and desired scaling of the two images may be accomplished by the boresight alignment station 100 electronically. For example, the computer 106 may determine offsets and scaling factors that may be used to align the two images using software in the video data processing stream without manually moving the visible light camera 202 or the infrared camera 203.

Figure 3:
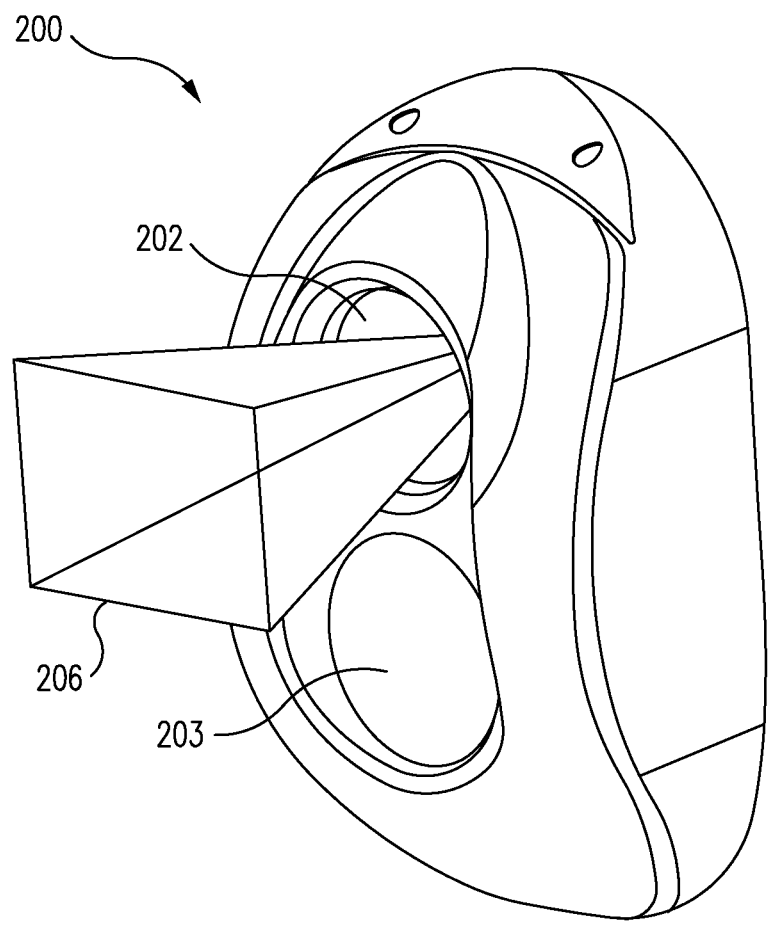
FIG. 3 shows a perspective view illustrating a bezel having a visible light camera and an infrared camera, in accordance with an embodiment of the invention.

FIG. 3 shows a perspective view illustrating the bezel 200 removed from the camera assembly 201, in accordance with an embodiment of the invention. The bezel 200 may be removed from the camera assembly 201 for the boresight alignment procedure. Generally, removal of the bezel 200 from the camera assembly 201 better facilitates mounting of the visible light camera 202 and the infrared camera 203 upon the boresight alignment station 100. Alternatively, the camera assembly 201 may be mounted to the boresight alignment station 100. As a further alternative, the plate 204 to which the visible light camera 202 and the infrared camera 203 are attached may be mounted upon the boresight alignment station without the bezel 200.

Figure 4:
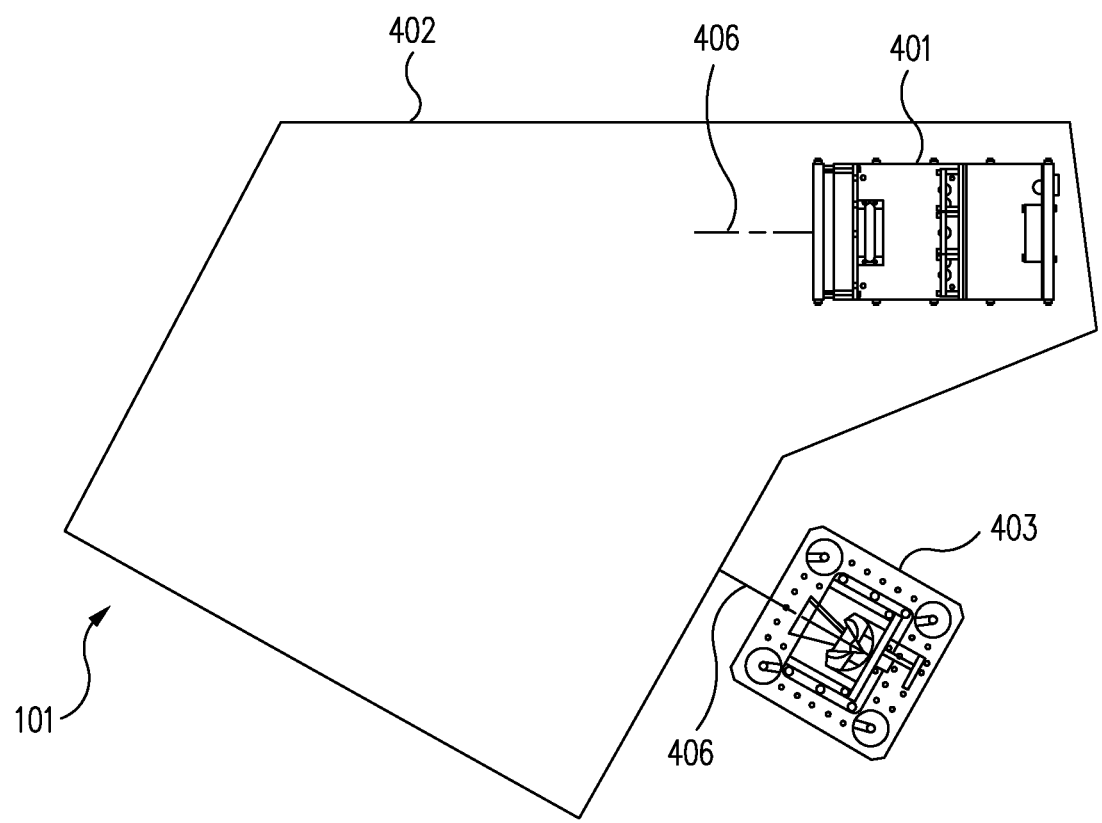
FIG. 4 shows a plan view illustrating a target and collimator assembly, in accordance with an embodiment of the invention.

FIG. 4 shows a plan view illustrating the target and collimator assembly 101, in accordance with an embodiment of the invention. The target and collimator assembly 101 comprises a target assembly 401, a collimator 402, and a bezel mount 403. The collimator 402 may, for example, be a model WF575 collimator provided by Santa Barbara Infrared, Inc. of Santa Barbara, Calif. The collimator 402 may have an optical axis 406.

The target assembly 401 and the bezel mount 403 may be disposed within a housing 404 of the collimator 402. Alternatively, the target assembly 401 and the bezel mount 403 may be outside the collimator 402.

The use of the collimator 402 may allow the visible light camera 202 and the infrared camera 203 to have their focuses set to infinity. Performing the boresight alignment process with the focus of the visible light camera 202 and the infrared camera 203 set to infinity may be advantageous in that focus at infinity is generally more easily obtained than focus at a particular finite distance. Setting the focus at infinity for the visible light camera 202 and the infrared camera 203 generally merely involves moving a focusing lens to one extreme of travel of the focusing lens. Thus, setting the focus at infinity substantially simplifies the focusing process and thereby reduces the time and cost associated with the boresight alignment process.

Furthermore, the use of the collimator 402 tends to mitigate parallax error. More particularly, the collimator 402 tends to minimize the parallax error between the visible light camera 202 and the infrared camera 203.

Thus, the collimator 402 tends to mitigate the need for parallax compensation. However, parallax compensation may be provided with or without the use of the collimator 402. For example, different parallax settings may be provided for different distances between the cameras 202, 203 and a plurality of targets 511-515 (see FIG. 6).

Furthermore, because the collimator 402 makes all of the targets 511-515 effectively appear to be at an infinite distance from the visible light camera 202 and the infrared camera 203, errors due to differences in their actual distances tend to be minimized. Thus, use of the collimator 402 tends to enhance precision of the boresight alignment process.

Figure 5:
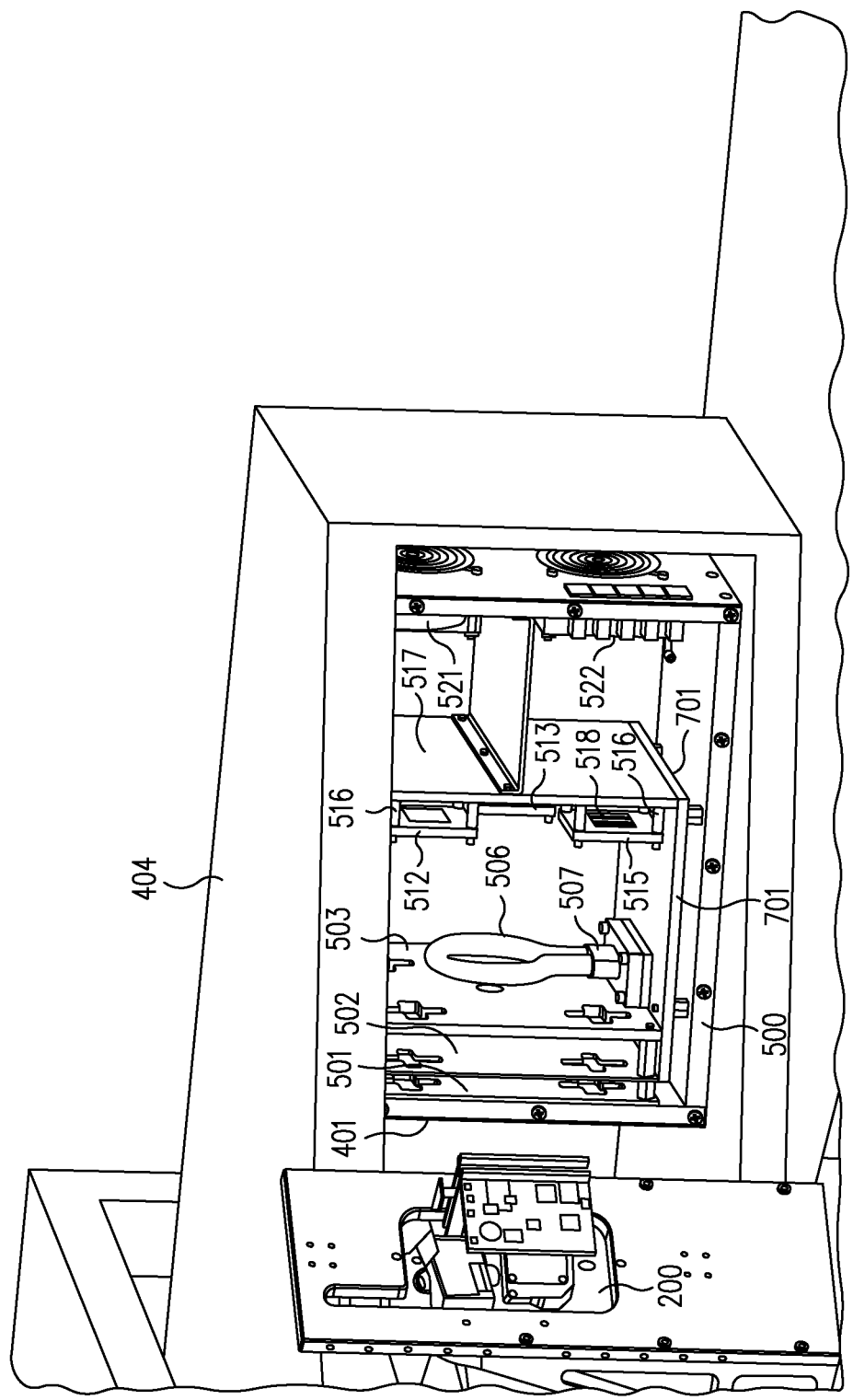
FIG. 5 shows a cutaway perspective view illustrating a target assembly installed in a boresight alignment station, in accordance with an embodiment of the invention.
Figure 6:
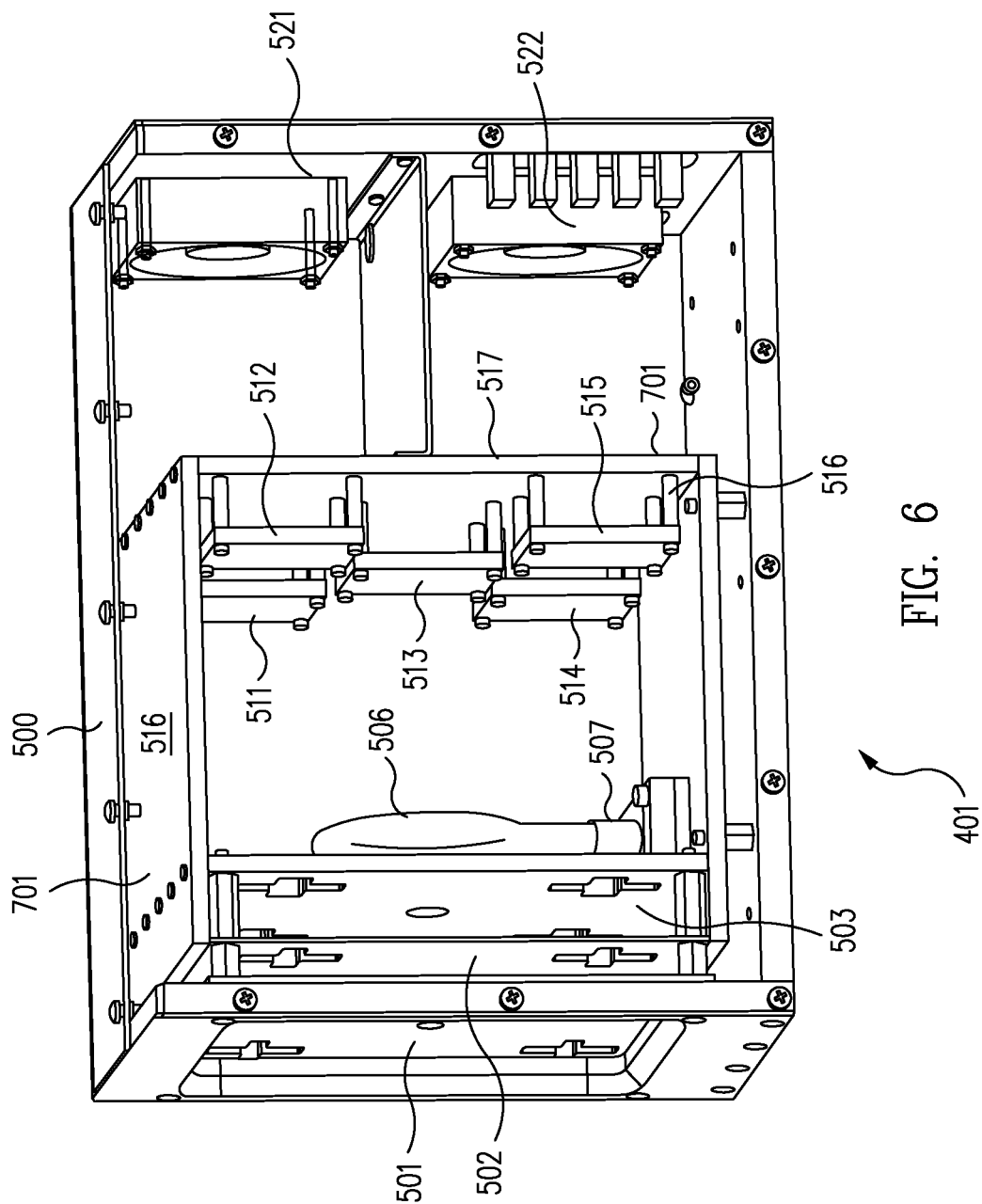
FIG. 6 shows a cutaway, perspective view illustrating a target assembly, in accordance with an embodiment of the invention.
Figure 7:
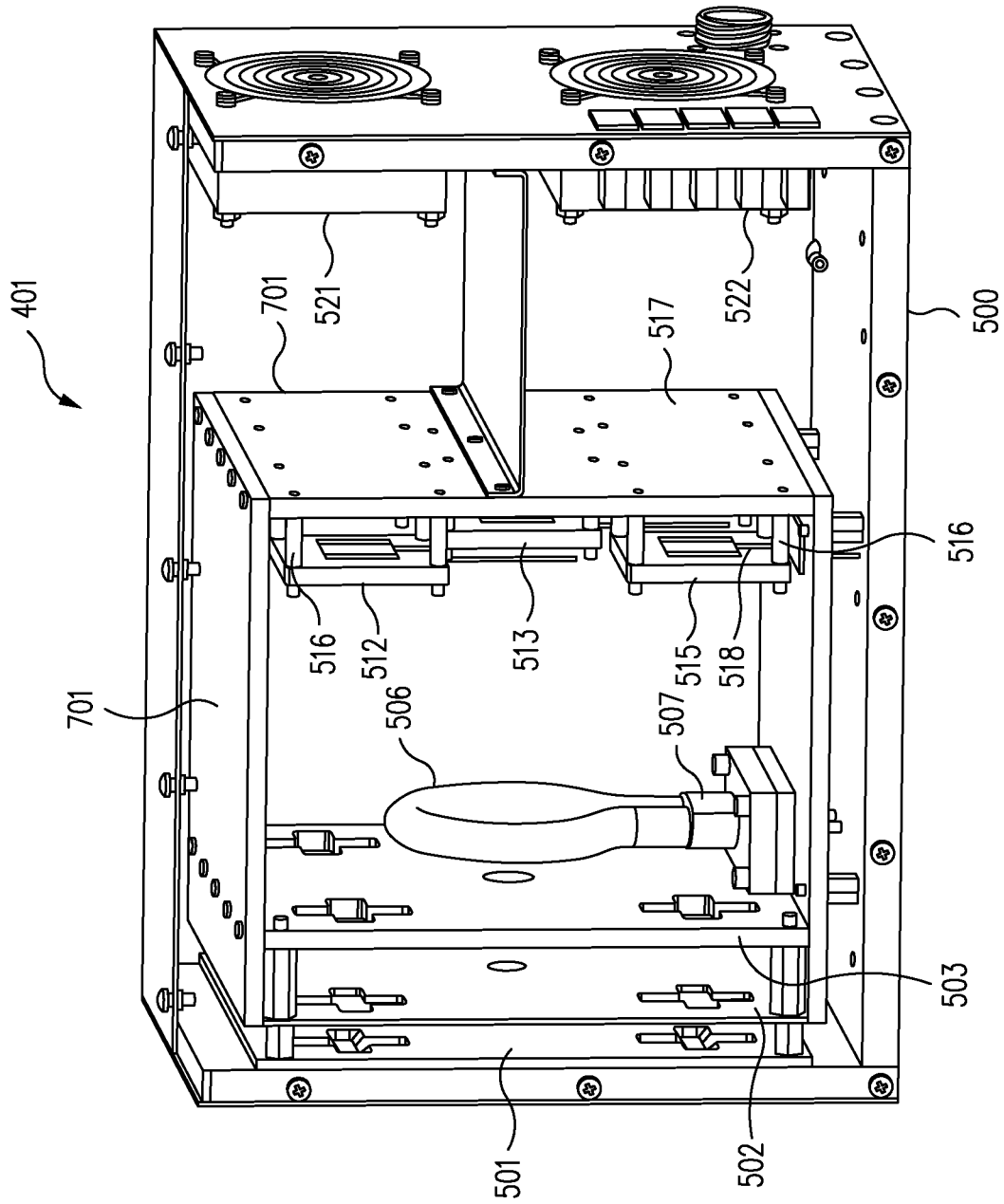
FIG. 7 shows a cutaway, perspective view illustrating a target assembly, in accordance with an embodiment of the invention.

FIGS. 5-7 show perspective views illustrating the target assembly 401, in accordance with an embodiment of the invention. The target assembly 401 may comprise an enclosure 500 within which components of the target assembly 401 are mounted.

The target assembly 401 may be installed within the housing 404 of the collimator 402. Alternatively, the target assembly 401 may substantially lack such a housing, e.g., may be mounted upon the optical bench 101 outside of or partially outside of any separate housing. Mounting the target assembly 401 inside of the housing 404 of the collimator 402 may be advantageous due to stray light mitigation, alignment, and assembly/maintenance benefits afforded by such construction.

The target assembly 401 may comprise a plurality of baffles, such as three baffles 501-503. The target assembly 401 may comprise any desired number of such baffles. For example, the target assembly 401 may comprise 0, 1, 2, 3, 4, or more baffles. The baffles 501-503 may define desirable target shapes. For example, the baffles 501-503 may define a plurality of crosses and a dot, as discussed herein.

The baffles 501-503 may substantially mitigate stray light from being incident upon and subsequently reflected by a generally corresponding plurality of the targets 511-515. It is desirable that the wavelength and intensity of light from the targets 511-515 be controlled so as to better facilitate the boresight alignment process. Mitigating stray light from being incident upon the targets enhances such control.

The baffles 501-503 may substantially mitigate stray light from being incident upon the visible light camera 202 and the infrared camera 203. Mitigating stray light from being incident upon the visible light camera 202 and the infrared camera 203 tends to enhance the contrast ratio of images provided thereby and thus better facilitates the boresight alignment process. In particular, enhancement of the contrast ratio may make recognition and use of the targets 511-515 by either the computer 106 or a human operator easier, more reliable, and more precise.

The target assembly 401 may comprise any desired number of targets. For example, the target assembly 401 may comprise 0, 1, 2, 3, 4, or more targets. The targets 511-515 may have any desired shape.

The targets 511-515 may be metal plates. For example, the targets 511-515 may be formed of copper. The targets 511-515 may be made of a material or combination of materials for which the temperature may be controlled, such as via resistive heaters 518, and for which the reflectance of visible light is adequate. Thus, the absolute and/or relative amounts of visible light and infrared radiation of the targets may be maintained within a range that readily facilitates the boresight alignment process.

A surface of the targets 511-515 may be polished or coated, e.g., painted, to enhance the reflectivity thereof. For example, a surface of the targets 511-515 may be painted white to enhance the amount of light reflected from a light source 506 through openings 801-805 (see FIG. 8) in the baffles 501-503 and to the visible light camera 202 and the infrared camera 203.

The enclosure 500 may be substantially light tight such that the only substantial light path into and out of the enclosure 500 is through the openings 801-805 (see FIG. 8) in the baffles 501-503. In this manner, stray light may be inhibited from being incident upon the targets 511-525 and/or the cameras 202, 203.

A light source 506 may be mounted on a light fixture 507 such that light from the light source 506 is incident upon and reflected by the targets 511-515. The light source 506 may be a fluorescent light, such as a toroidal fluorescent light bulb, for example. As further examples, the light source may be one or more incandescent light bulbs, one or more LED's, or any combination of fluorescent lights, incandescent lights, LED's, and any other types of light sources.

The use of a low heat producing light source 506, such as a fluorescent light bulb or a plurality of LED's, may be advantageous in that it may facilitate more independent control of the heat of the targets 511-515 because such a light source is not contributing to the heat of the targets 511-515. It may be advantageous to have the heat of the targets 511-515 substantially provided by and controlled by an independent heat source, such as the heaters 518.

The use of a toroidal light source 506 may provide an advantage of substantially uniform light illumination of the targets 511-515 without obscuring the center target 513. That is, light from the center target 513 may travel through a central opening in the toroidal light source 506.

The intensity of light from the light source 506 may be variable. In this manner, the intensity of light reflected by the targets 511-515 during the boresight alignment process may be varied to better facilitate alignment of the visible light camera 202 and the infrared camera 203.

Each of the targets 511-515 may have one of the heaters 518 in thermal communication therewith. Each of the heaters 518 may be independently controllable so as to facilitate independent control of the brightness of an image of each of the targets 511-515 captured by the infrared camera 203.

For example, each of the targets 511-515 may have the heater 518 attached to the back thereof such that varying a current through the heater 518 tends to vary a temperature of each of the targets 511-515. Thus, the infrared radiation provided by each of the targets 511-515 may be individually controlled. In this manner, the infrared radiation provided by the targets 511-515 as a whole and/or the infrared radiation provided by one or more selected targets 511-515 may be raised or lowered so as to better match visible light reflected by the targets 511-515 and thus so as to better facilitate alignment of the visible light camera 202 with respect to the infrared camera 203.

Both the intensity of the light source 506 and the heat provided by the heaters 518 may be controlled by the computer 106. Thus, the computer may control the intensity of both visible light and infrared light provided by the targets 511-515.

The targets 511-515 may be mounted upon a common wall or plate 517. For example, the targets 511-515 may be mounted upon the plate 517 via standoffs 516 that tend to thermally isolate the targets 511-515 from the plate 517 and from one another. The standoffs 516 may be formed of a ceramic material, for example. Such thermal isolation of the targets 511-515 tends to enhance the ability to individually control the temperature thereof.

Each of the targets 511-515 may be mounted to have a surface thereof that is approximately co-planar with a surface of all of the other targets 511-515. Thus, all of the targets 511-515 may be approximately the same distance from the visible light camera 202 and the infrared camera 203 and may be substantially within the same focal plane to better facilitate focusing of the visible light camera 202 and the infrared camera 203. The use of the collimator 402 may mitigate undesirable affects associated with deviations in positioning of the targets 511-515 such that they are not co-planar, as discussed herein.

One or more fans 521, 522 may be used to cool the target assembly 401. Cooling the target assembly 401 may better facilitate control of the temperature of the targets 511-515 and may prevent excessive heat buildup within the target assembly 401.

The fans 521, 522 may be used to cool the baffles 501-503. Cooling the baffles 501-503 may prevent excessive heat buildup in the baffles 501-503 that may cause the radiation of infrared radiation which may undesirably interfere with the boresight alignment process (such as by obscuring infrared radiation from the targets 511-515 and/or undesirably reducing the contrast of images of the targets 511-515 captured by the infrared camera 203).

A universal serial bus (USE) controller (not shown), for example, may be used to control the fans 521 and 522. The fans 521 and 522 may be thermostatically controlled to maintain a desired temperature within the target assembly 401.

The target assembly 401 may comprise an internal housing 701 that mitigates stray light from being incident upon the targets 511-515 and/or the cameras 202, 203. Surfaces of the target assembly 401 that may reflect stray light may be painted flat black to mitigate stray light from being incident upon the targets 511-515 and/or the cameras 202, 203. Thus, the target assembly 401 may be configured, e.g., shielded, to inhibit stray light from reaching the targets 511-515. Such configuration may also inhibit stray light from reaching the visible light camera 202 and the infrared camera 203, where such stray light may interfere with the boresight alignment process.

Figure 8:
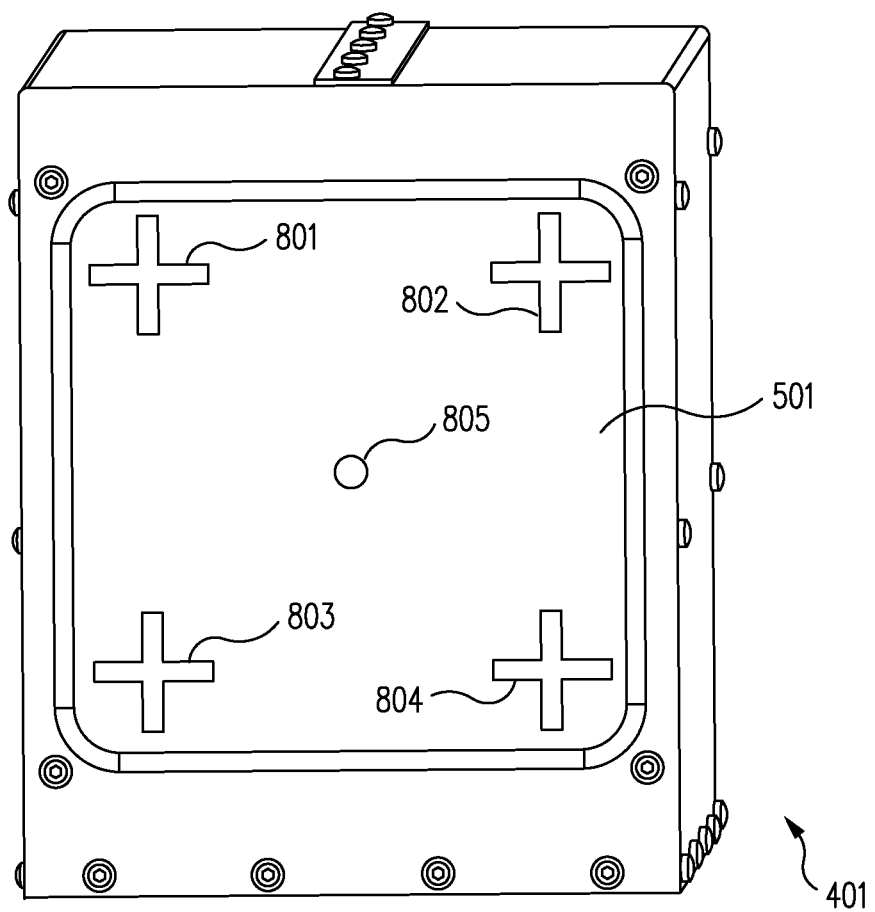
FIG. 8 shows a front perspective view illustrating a target assembly, in accordance with an embodiment of the invention.

FIG. 8 shows a front perspective view illustrating the target assembly 401, in accordance with an embodiment of the invention. Each of the baffles 501-503 (only baffle 501 is shown in FIG. 8, see FIGS. 5-7 for baffles 502 and 503) may have a plurality of cutouts or openings 801-805 formed therein. For example, each of the baffles 501-503 may have four openings 801-804 that define crosses proximate to four corners of the baffles 501-503 and may have one round opening 805 proximate to the center of each of the baffles 501-503.

The baffles 501-503 may be reflective on a side thereof facing toward the targets 511-515 to enhance an amount of light from the light source 506 that is incident upon the targets 511-515. The baffles 501-503 may be absorptive, e.g., flat black, on a side thereof facing away from the targets 511-515 to mitigate stray light, e.g., ambient light, from being incident upon the targets 511-515. One or more of the baffles 501-513 may have a surface thereof made reflective by polishing, coating, and/or painting. For example, a surface of the baffle 503 closest to the targets 511-513 may be painted white to enhance the reflectivity thereof (e.g., for visible light).

The openings 801-805 define the shapes of images produced by the targets 511-518. Thus, the openings 801-805 define the shapes of images that are imaged by the visible light camera 202 and the infrared camera 203. As shown in FIG. 8 as an example, four of the images may be crosses (the images corresponding to openings 801-804) and one of the images may be a dot (the image corresponding to opening 805).

Both the visible light camera 202 and the infrared camera 203 will image the crosses of openings 801-804 and the dot of round opening 805 during the boresight alignment process. These images may be used to align the visible light camera 202 and the infrared camera 203 for x-position, y-position, x-scaling, y-scaling, and rotation.

Figure 9:
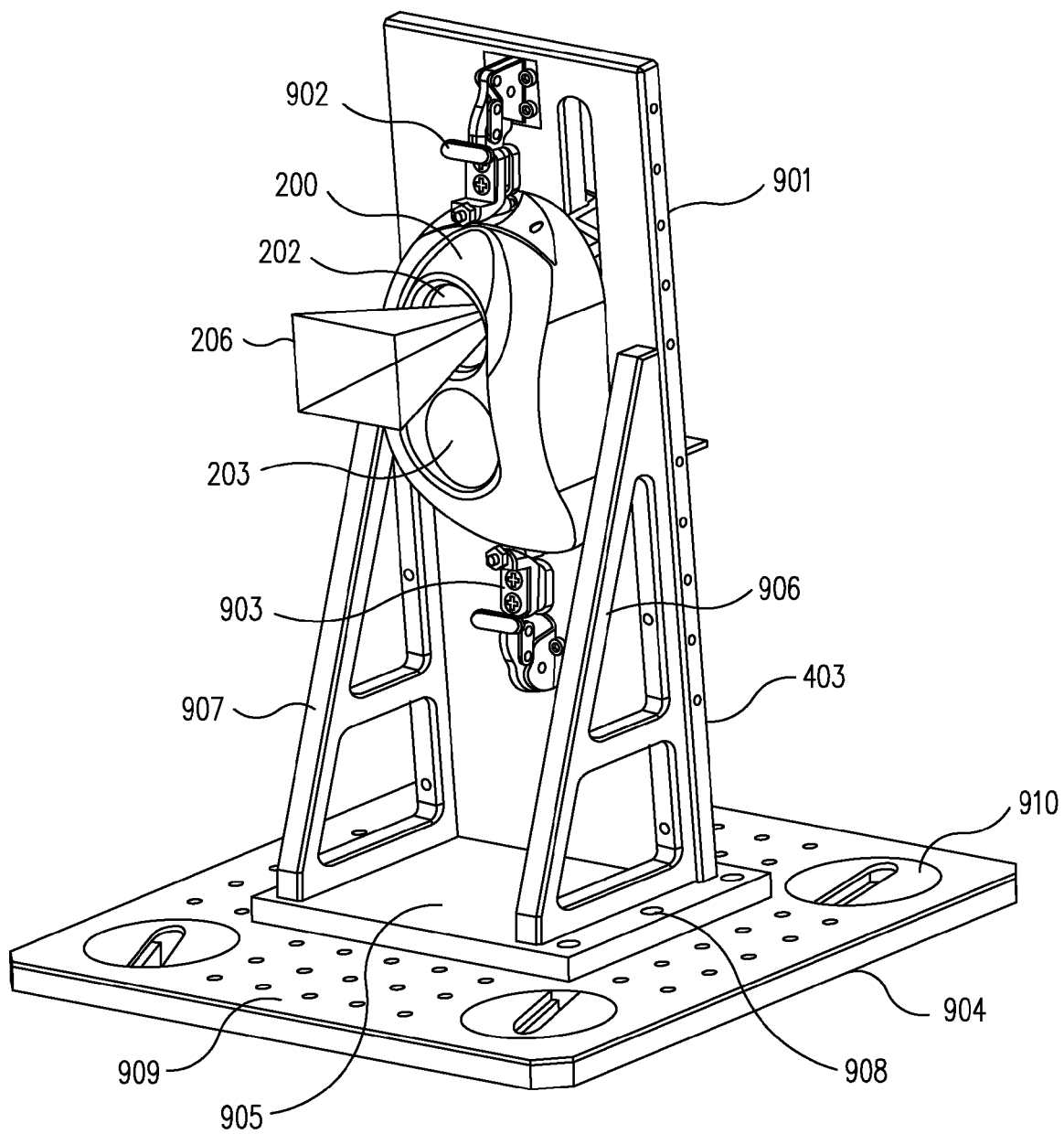
FIG. 9 shows a front perspective view illustrating a bezel mount with a bezel attached thereto, in accordance with an embodiment of the invention.

FIG. 9 shows a front perspective view illustrating the bezel mount 403 with the bezel 200 attached thereto, in accordance with an embodiment of the invention. The bezel mount 403 may comprise an upstanding plate 901 to which the bezel 200 attaches via two clamps 902 and 903. The clamps 902 and 903 may be over center clamps.

The upstanding plate 902 may extend upwardly from a bottom plate 905. Braces 906 and 907 may facilitate rigid attachment of the upstanding plate 902 to the bottom plate 905.

The bottom plate 905 may attach to a base 904, such as via screws 908. A plurality of threaded holes 909 may be formed in the base 904 to facilitate desired positioning of the bottom plate 905 (and consequently the upstanding plate 901 and the bezel 200) thereon. The base 904 may attach to the optical bench 102 via screw positioners 910, as discussed herein.

Figure 10:
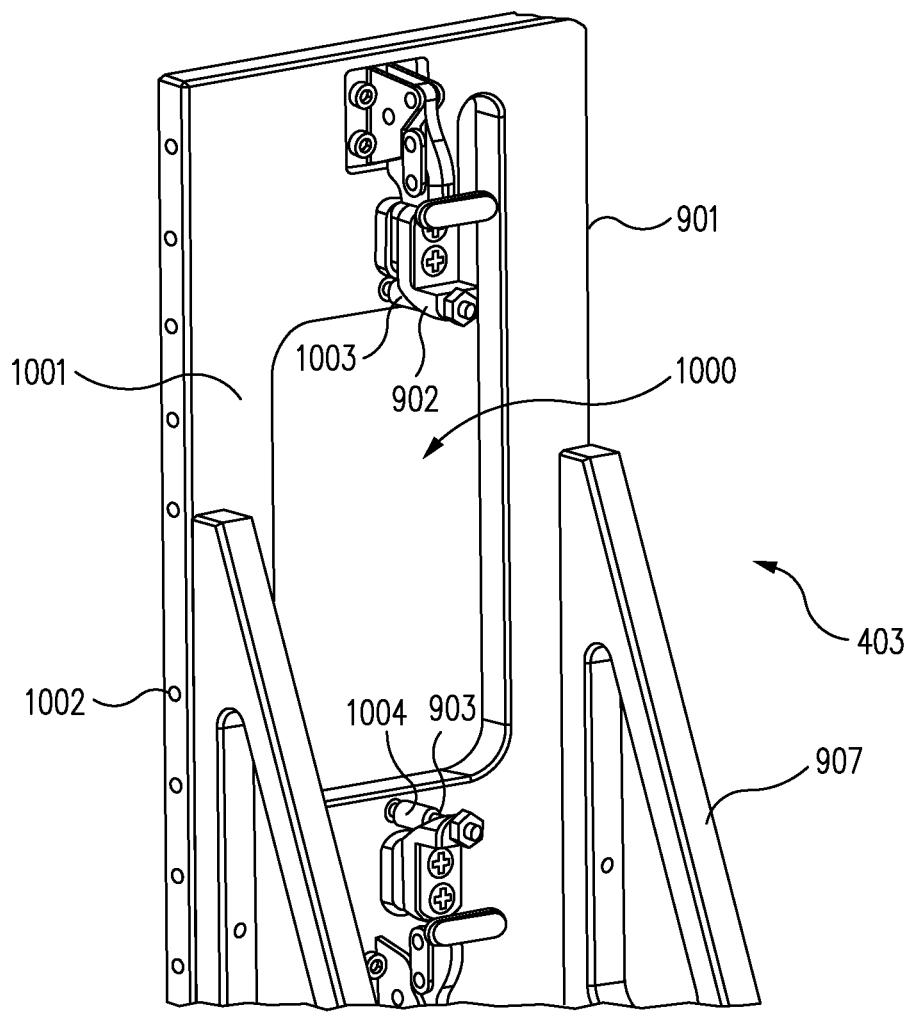
FIG. 10 shows a front perspective view illustrating a bezel mount without a bezel attached thereto, in accordance with an embodiment of the invention.

FIG. 10 shows a front perspective view illustrating the bezel mount 403 without a bezel 200 attached thereto, in accordance with an embodiment of the invention. The bezel 200 may mount flush with a front surface 1001 of the upstanding plate 901. An opening 1000 may be formed in the upstanding plate 901 and may be configured to receive a portion of the visible light camera 202, the infrared camera 203, and/or associated items, e.g., electronics 1201 (see FIG. 12) there through.

Threaded holes 1002 may be provided in the plate 901 to facilitate the attachment of wiring to the bezel mount 403. For example, conventional cable clamps (not shown) may be used to tie down cables of the visible light camera 202 and the infrared camera 203 using the threaded holes 1002. The threaded holes 1002 may be used to mount electronic equipment to the bezel mount 403. For example, a video processor associated with the visible light camera 202 and/or the infrared camera 203 may be attached to the bezel mount 403 via the threaded holes 1002.

Pins 1003 and 1004 may be received within complimentary openings of the bezel 200 to facilitate mounting of the bezel 200 to the bezel mount 403. The pins 1003 and 1004 may assure desired alignment of the bezel 200 with respect to the bezel mount 403.

The clamps 902 and 903 may press down upon or around the pins 1003 and 1004 to provide positive attachment of the bezel 200 to the bezel mount 403. In this manner, undesirable movement of the bezel 200 with respect to the bezel mount 403 may be mitigated.

Figure 11:
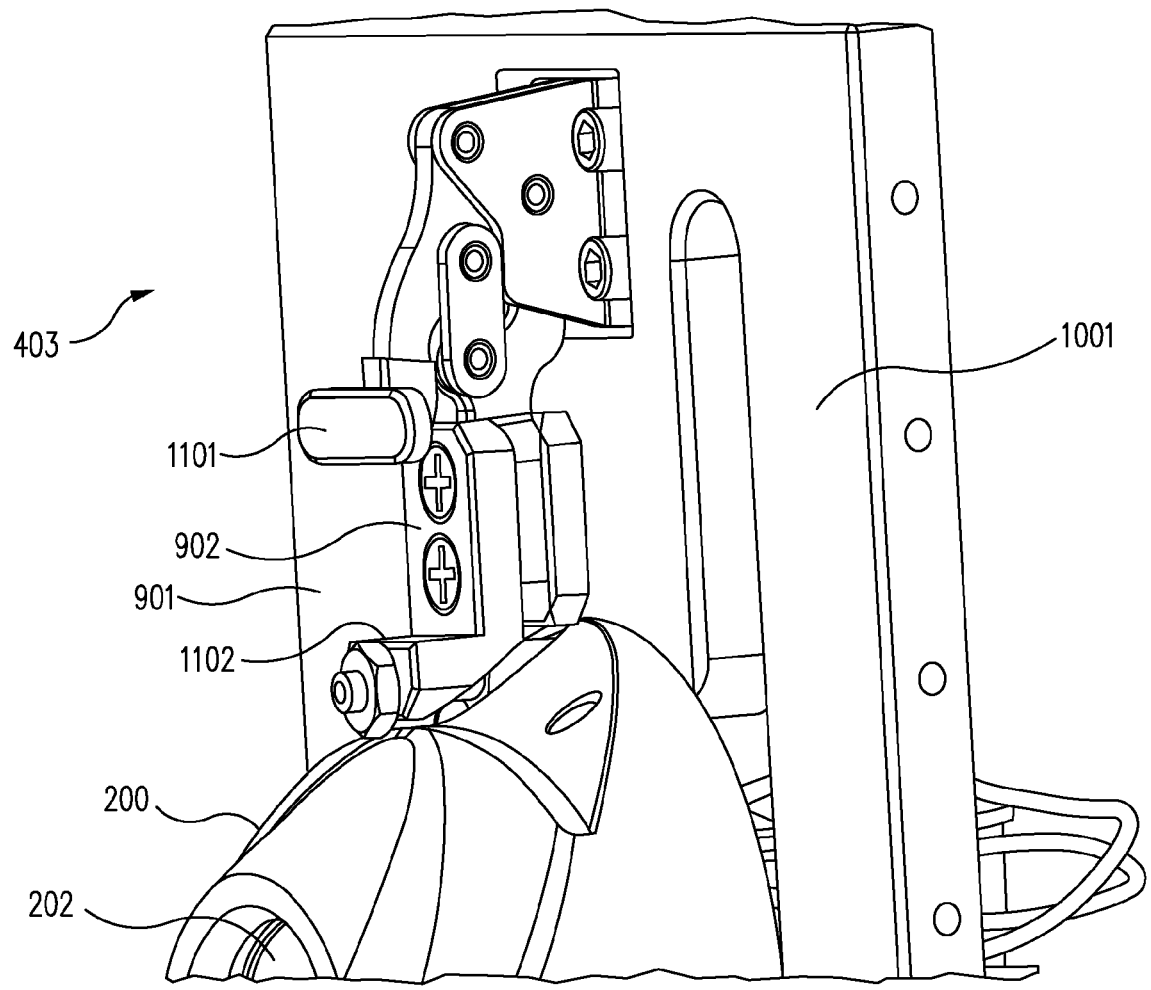
FIG. 11 shows an enlarged perspective view illustrating a clamp of a bezel mount, in accordance with an embodiment of the invention.

FIG. 11 shows an enlarged perspective view illustrating the clamp 902 of a bezel mount 403, in accordance with an embodiment of the invention. Clamping may be effected by pressing pad 1101 toward the upstanding plate 901 so as to cause a clamping member 1102 to clamp down upon the bezel 200.

Figure 12:
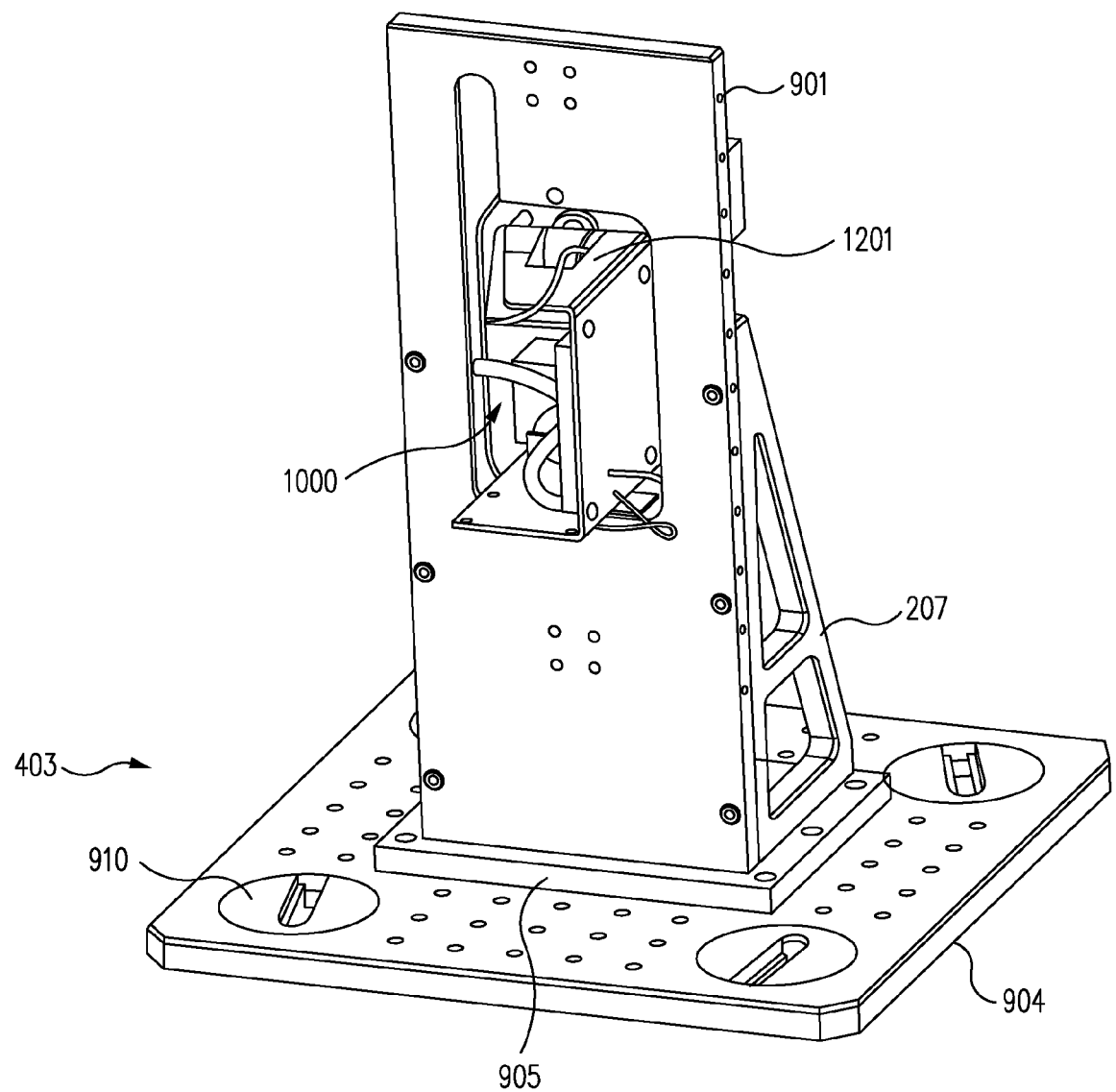
FIG. 12 shows a back perspective view illustrating a bezel attached to a bezel mount, in accordance with an embodiment of the invention.
Figure 13:
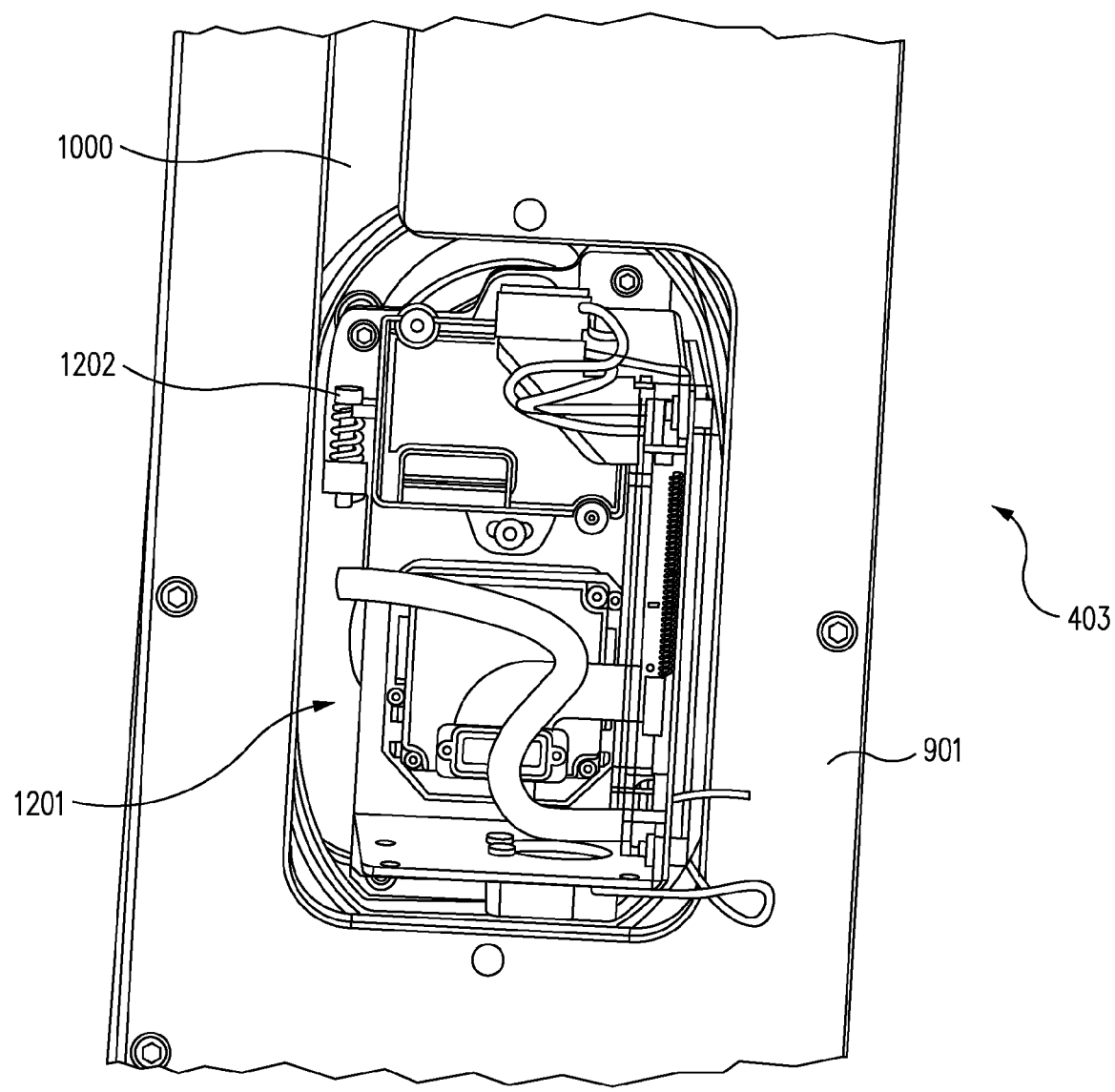
FIG. 13 shows an enlarged, back perspective view illustrating a bezel attached to a bezel mount, in accordance with an embodiment of the invention.

FIGS. 12 and 13 shows back perspective views illustrating the bezel 200 attached to the bezel mount 403, in accordance with an embodiment of the invention. The electronics 1201 associated with the visible light camera 202 and the infrared camera 203 may extend through the opening 1000 in the upstanding plate 901.

Figure 14:
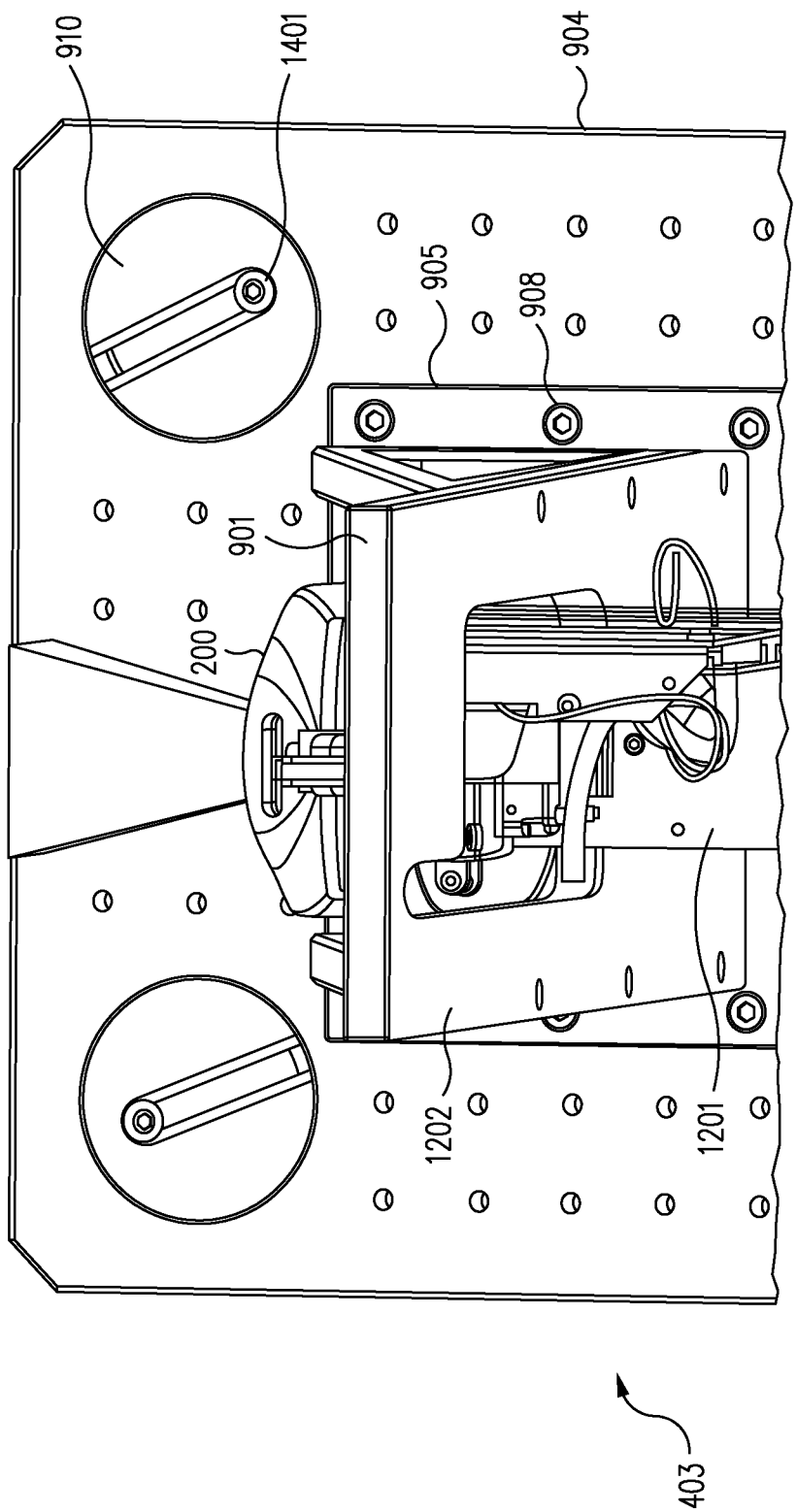
FIG. 14 shows an enlarged, top perspective view illustrating a bezel attached to a bezel mount, in accordance with an embodiment of the invention.

FIG. 14 shows an enlarged, top perspective view illustrating a bezel 200 attached to a bezel mount 403, in accordance with an embodiment of the invention. Rotatable screw positioners 910 allow positioning of mounting screws so as to facilitate desired rotation of the bezel mount 403 upon the optical bench 102. Such rotation allows the bezel mount 403, and consequently the bezel 200, to be positioned orthogonally with respect to the optical axis 406 (see FIG. 4) of the collimator 402.

A mechanical adjustment, e.g., adjusting screw 1202, provides manual adjustment of rotation of the visible light camera 202 to facilitate rotational alignment of the visible light camera 202 with respect to the infrared camera 203. In addition to or as an alternative to manual adjustment of the rotation of the visible light camera 202, manual adjustment of the rotation of the infrared camera 203 may be provided.

Figure 15:
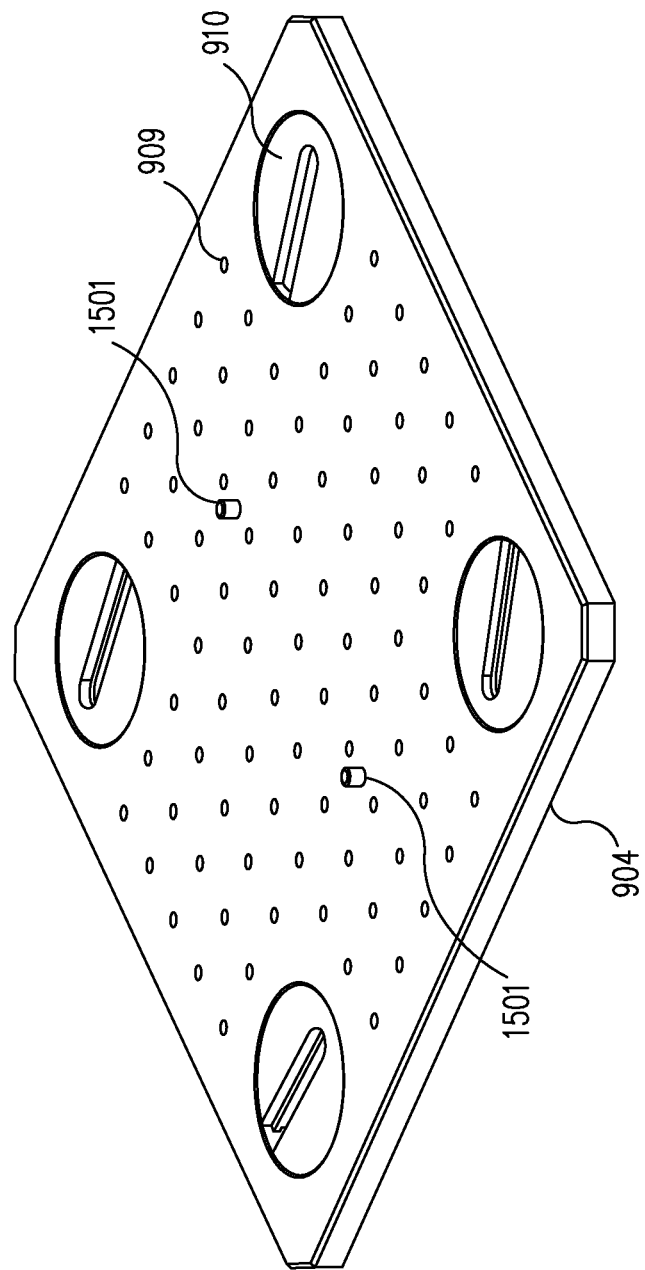
FIG. 15 shows a perspective view illustrating a base, in accordance with an embodiment of the invention.

FIG. 15 shows a perspective view illustrating the base 904, in accordance with an embodiment of the invention. Dowels 1501 may extend upwardly from the base 904 and may be received by complimentary openings in the bottom plate 905. Thus use of such dowels 1501 may facilitate repeatable attachment of different bottom plates to the bezel mount 403.

Figure 16:
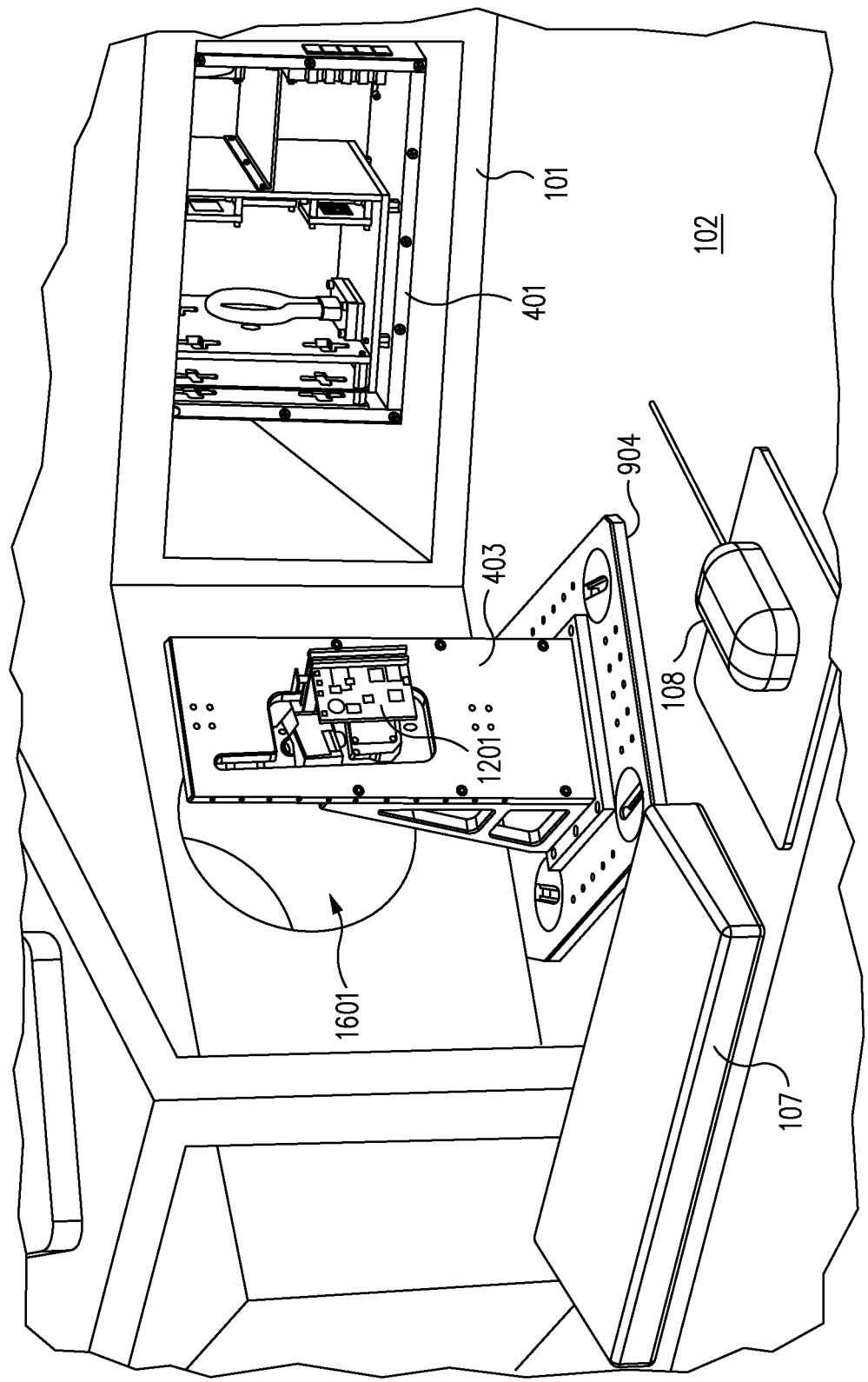
FIG. 16 shows a perspective view illustrating a bezel attached to a bezel mount wherein the bezel mount is attached to a boresight alignment station, in accordance with an embodiment of the invention.

FIG. 16 shows a perspective view illustrating the bezel 200 attached to the bezel mount 403, wherein the bezel mount 403 is attached to a boresight alignment station 100, in accordance with an embodiment of the invention. An opening 1601 is provided in the housing 404 to provide light from the targets 511-515 to the visible light camera 202 and the infrared camera 203, after the light passes through the baffles 501-503 and the collimator 402.

Algorithms may operate according to well-known principles, as would be understood by one skilled in the art, to facilitate the following: operator assisted focus at infinity; operator assisted rotational alignment; automated image registration measurement; determination of the x-scale factor and the y-scale factor; determination of the x-offset and the y-offset; and the selection of cameras (e.g., both the visible light camera 202 and infrared camera 203) with an adequate field of view. These algorithms are discussed further below, with reference to FIGS. 17-21.

Figure 17:
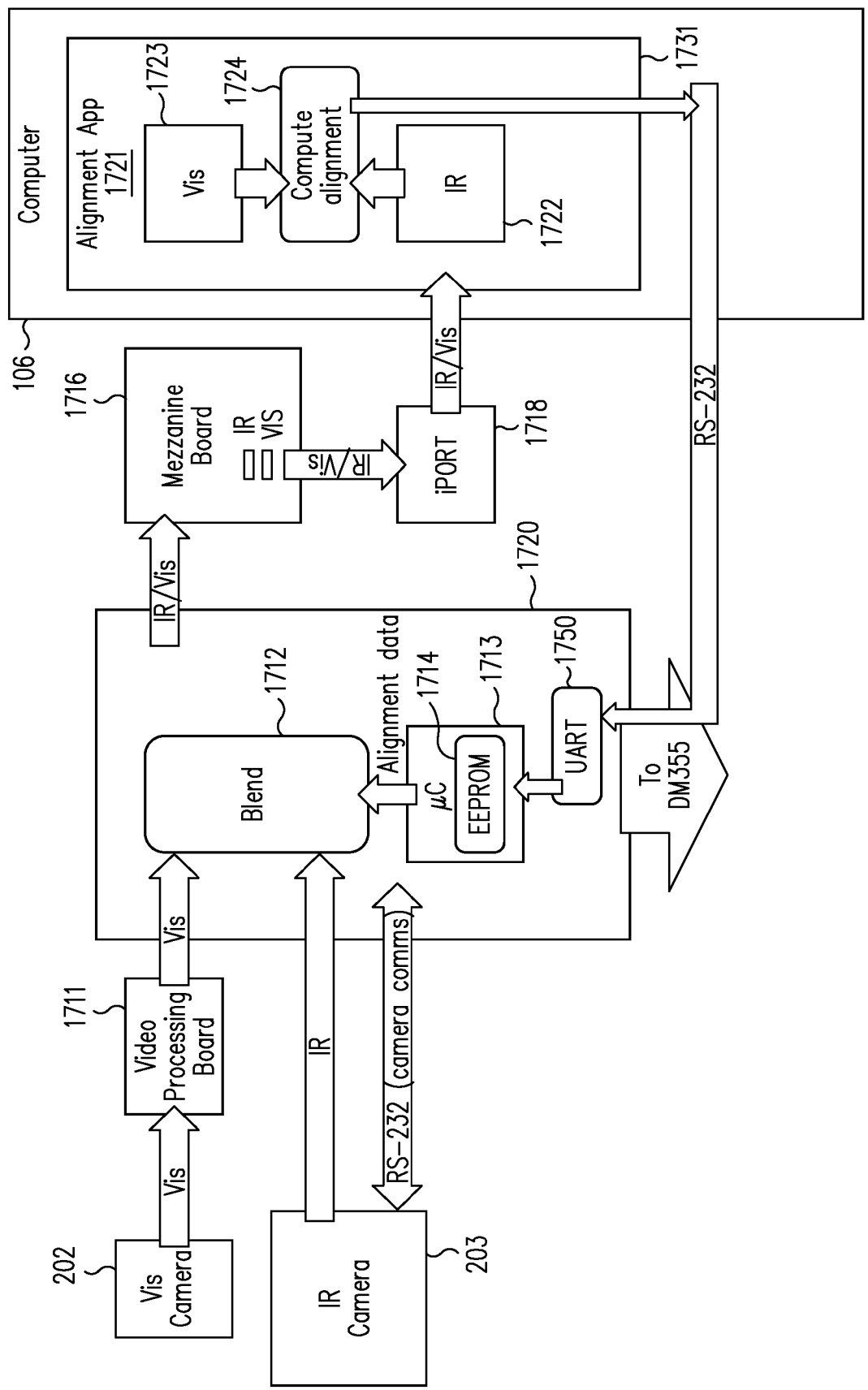
FIG. 17 shows a block diagram illustrating a system and communications architecture, in accordance with an embodiment of the invention.

FIG. 17 shows a block diagram illustrating a system and communications architecture in accordance with an embodiment of the invention. The visible light camera 202 provides an output to a video processing board 1711. The video processing board 1711 processes the output of the visible light camera 202 to provide a video signal of a desired format. Examples of such video processing boards include those manufactured by Tetracam of Chatsworth, Calif.

The processed output of the video processing board 1711 may be provided to blender electronics 1720. More particularly, the processed output of the video processing board 1711 may be provided to a blender 1712. The blender 1712 may combine the outputs of the visible light camera 202 and the infrared camera 203 to form a combined frame according to well know principles as would be understood by one skilled in the art.

Blending the outputs of the visible light camera 202 and the infrared camera 203 may result in both visible light images of the targets 511-515 and infrared images of the targets 511-515 being present in a single blended image or combined frame. When the visible light camera 202 and the infrared camera 203 are aligned with respect to one another, then the visible light images of the targets 511-515 and infrared images of the targets 511-515 substantially overlap one another, e.g., are generally co-incident with one another.

The x-position and y-position corrections may be made via the computer 106 without requiring manual adjustment or repositioning of the visible light camera 202 and/or the infrared camera 203. Thus, correction factors may be generated that enhance alignment of the visible light images of the targets 511-515 and the infrared images of the targets 511-515 in the combined frame.

The combined frame may be provided to a mezzanine board 1716 that processes the combined frame to provide a desired video format, e.g. a video format that is compatible with the computer 106. The output of the mezzanine board 1716 may be provided to an iPort 1718 that facilitates importing the combined frame into the computer 106 for use in the boresight alignment process by an alignment application 1721.

The alignment application 1721 uses an alignment computation algorithm 1724 that operates upon a visible camera image 1723 and an infrared image 1722 to determine the amount of x-position, y-position, x-scaling, y-scaling, and/or rotation misalignment that is present in the combined frame, compute correction factors for these misalignments, and provide correction signals that are representative of the misalignments.

The correction signals may be used to electronically correct for x-position, y-position, x-scaling, and y-scaling misalignment, and may be used to facilitate manual correction of rotation misalignment. Alternatively for an embodiment, the correction signals may be used to electronically correct for x-position, y-position, x-scaling, y-scaling, and rotational misalignment.

The correction signals may be applied to the blending electronics 1720, such as via an RS-232 connection, a universal asynchronous receiver-transmitter (UART) 1750, and a microcomputer 1713 (e.g., a microcontroller, a processor, or other type of logic device). Memory 1714 (e.g., electronically erasable programmable read only memory (EEPROM)) may provide software (e.g., firmware, software, or configuration data such as for a programmable logic device) for the operation of the microcomputer 1713. The microcomputer 1713 may cooperate with the blender 1712 to combine the visible light image and the infrared image into a blended image or combined frame.

More particularly, the microcomputer 1713 may apply the correction signals to the visible light image and/or the infrared image to change the x-position, y-position, x-scaling, y-scaling, and/or rotation thereof so as to enhance the alignment of the visible light image with respect to the infrared image. The blending electronics 1720 may provide an output to a video board, such as a Texas Instruments DM355 Embedded Processor (not shown), to facilitate viewing of the combined frame on the monitor 109.

Figure 18:
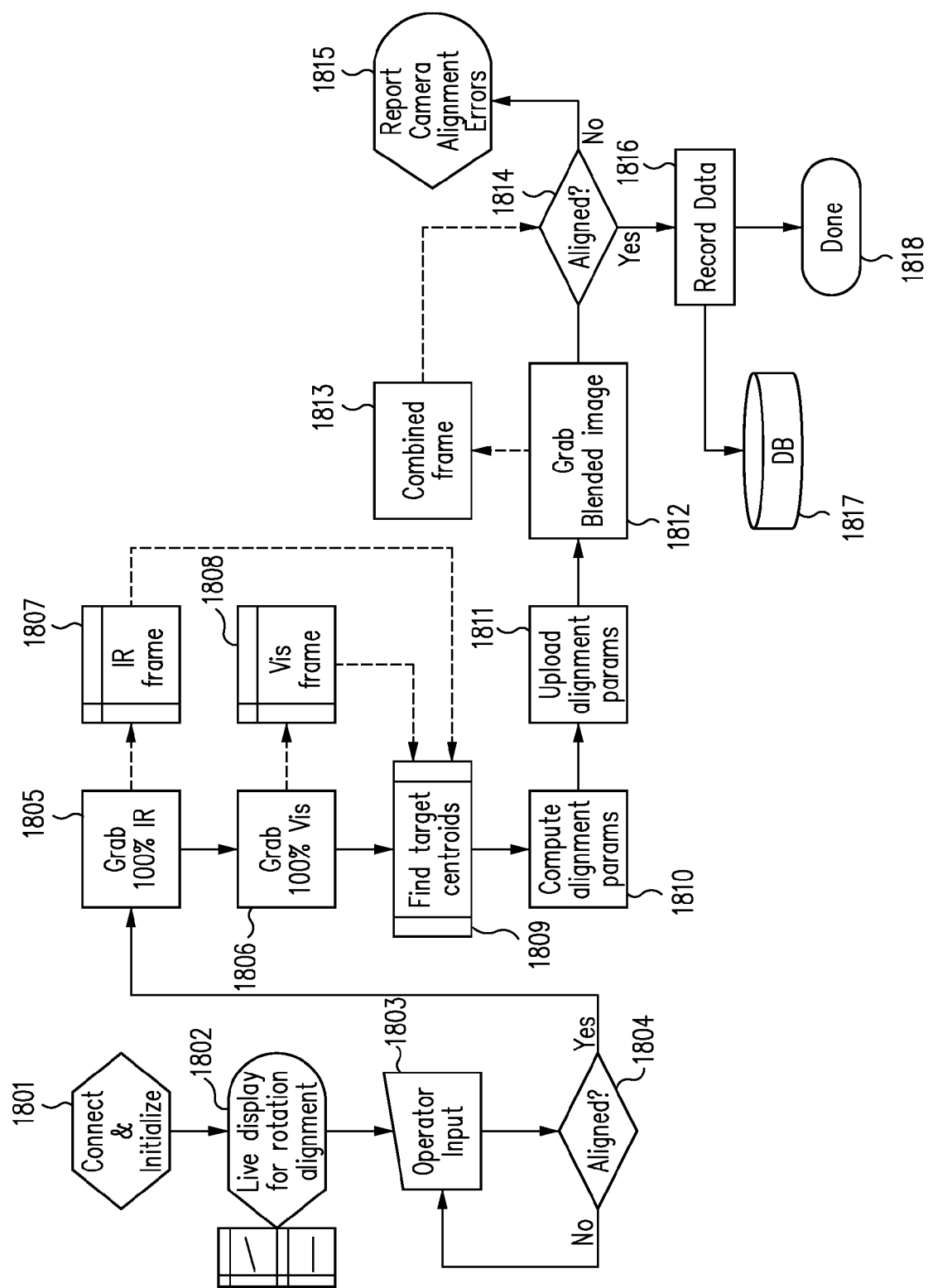
FIG. 18 shows a flowchart illustrating a host software flow, in accordance with an embodiment of the invention.

FIG. 18 shows a flowchart illustrating a host software flow for the boresight alignment process, in accordance with an embodiment of the invention. The host may be the computer 106, for example. The host may alternatively be a remote computer, such as a network connected computer. The host may be any desired computer or combination of computers.

The boresight alignment process may begin with connection and initialization of the computer 106, as indicated in block 1801. After the computer 106 has been connected and initialized, a live display (e.g., to assist with the rotational alignment of the visible light camera 202 and the infrared camera 203) may be provided, as indicated in block 1802. The live display may provide the images and/or rotational cues or instructions to assist with rotation correction via an operator or to illustrate an automated process.

The live display 1802 may provide a real-time graphical representation that is indicative of the alignment of the visible light camera 202 and the infrared camera 203. The live display 1802 may be used to facilitate manual alignment of the rotation of the visible light camera 202 with respect to the infrared camera 203. Alignment of the rotation of the visible light camera 202 with respect to the infrared camera 203 may be done manually, such as by turning adjusting screw 1202 of the visible light camera 202 to facilitate physical rotational alignment of the visible light camera 202 with respect to the infrared camera 203.

Alternatively, the alignment of the rotation of the visible light camera 202 with respect to the infrared light camera 203 may be done electronically, either with user input (wherein the user determines whether the visible light camera 202 and the infrared camera 203 are misaligned and provides input to the computer, such as via the keyboard 107 and/or the mouse 108, to correct the misalignment) or without user input (wherein the computer determines whether the visible light camera 202 and the infrared camera 203 are misaligned and autonomously corrects the misalignment).

Mechanical alignment of the rotation of the visible light camera 202 with respect to the infrared camera 203 may be done automatically, such as by using an actuator, stepper motor, or the like to effect turning of the adjusting screw 1202 of the visible light camera 202. Such automatic alignment of the rotation may be done under the control of computer 106.

When the rotation alignment process is performed with manual input from a user or operator, the operator may provide an input (such as by turning alignment adjustment screw 1202) to effect rotation of the visible light camera 202 and/or the infrared camera 203, as indicated in block 1803. The operator may then the determine if the visible light camera 202 and the infrared camera 203 are adequately aligned with respect to one another, as indicated in block 1804. Determining if the visible light camera 202 and the infrared camera 203 are adequately aligned with respect to one another may be done using the live display, as indicated in block 1802. The process of providing an operator input 1803 and determining if the visible light camera 202 and the infrared camera 203 are adequately aligned with respect to one another may continue until the operator determines that the visible light camera 202 and the infrared camera 203 are adequately aligned with respect to one another.

Once the visible light camera 202 and the infrared camera 203 are adequately aligned with respect to one another in rotation, then the boresight alignment process may continue with x-position, y-position, x-scaling, and y-scaling. An infrared image (e.g., 100% infrared (IR) image) may be captured from the infrared camera 203, as indicated in block 1805, to define infrared frame 1807. A visible light image (e.g., 100% visible light image) may be captured from the visible light camera 202, as indicated in block 1806, to define infrared frame 1808.

The centroids of the targets 511-515 may be found, as indicated in block 1809. The centroids of each individual target 511-515 may be found. Various conventional algorithms are suitable for finding the centroids, as would be understood by one skilled in the art.

The goal of the boresight alignment procedure may be to have the centroids of images of each of the targets 511-515 in infrared to align or be co-incident with corresponding centroids of images of the targets 511-515 in visible light. When all of the centroids of all of the targets 511-515 are so aligned, then the image of the visible light camera 202 is aligned with respect to the image of the infrared camera 203.

Using the computed centroids, alignment parameters may be computed, as indicated in block 1810. The alignment parameters may be representative of the relative alignment of the infrared image with the visible light image. The alignment parameters may be uploaded to the blending electronics 1720, as shown in block 1811. The blending electronics 1720 may use the alignment parameters to electronically align the infrared image with the visible light image.

The combined frame may be grabbed or captured, as indicated in block 1812 to define the combined frame 1813. The combined frame 1813 may be checked to see if the infrared image and the visible light image are adequately aligned with respect to one another, as indicated in block 1814. If the infrared image and the visible light image are adequately aligned with respect to one another, the alignment parameters may be recorded 1816 to a database 1817 and the alignment process is done, as indicated in block 1818.

If the infrared image and the visible light image are not adequately aligned with respect to one another, then the camera alignment errors may be reported, as indicated in block 1815. The camera alignment errors may be reported to the blender electronics 1720, as discussed herein. Reporting the camera alignment errors may include displaying the alignment parameters and/or camera alignment errors on the display 109. The process of computing the alignment parameters, uploading the alignment parameters, grabbing the combined frame, and checking to see if the infrared image and the visible light image are adequately aligned may be repeated as necessary until desired alignment is achieved.

Figure 19:
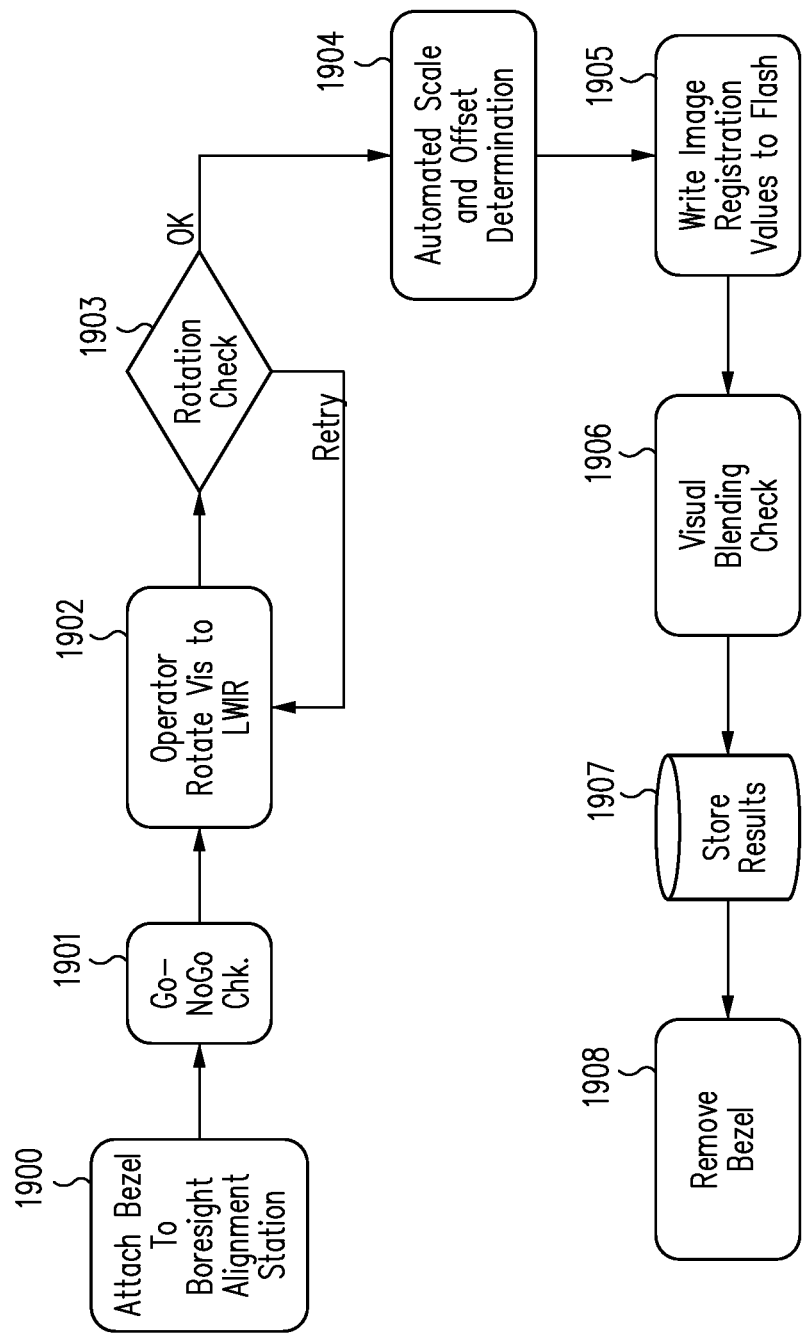
FIG. 19 shows a flowchart illustrating an overall boresighting process, in accordance with an embodiment of the invention.

FIG. 19 shows a flowchart illustrating the overall boresighting process, in accordance with an embodiment of the invention. The operator may attach the bezel 200 to the boresight alignment station 100, as indicated in block 1900. The bezel 200 may be attached to the boresight alignment station 100 using the clamps 902 and 903 of the bezel mount 403. The visible light camera 202 and the infrared camera 203 may be electronically connected to the boresight alignment station 100.

A go-no go check may be performed by the computer 106 after the bezel 200 is mounted and electronically connected to the boresight alignment system 100, as indicated in block 1901. The go-no go check may analyze outputs of the visible light camera 202 and the infrared camera 203 to determine if the visible light camera 202 and the infrared camera 203 are suitable for proceeding with the boresight alignment process. For example, the outputs of the visible light camera 202 and the infrared camera 203 may be analyzed to determine if video signals are present, if the video signals are of the expected format, and if the images are sufficiently aligned to proceed.

The operator may physically rotate the visible light camera 202 to enhance the alignment of the visible light camera 202 in rotation with respect to the infrared camera 203, as indicated in block 1902. The rotational alignment of the visible light camera 202 with respect to the infrared camera 203 may be checked as indicated in block 1903 and the visible light camera 202 may be further rotated so as to enhance this alignment. This process may be repeated as necessary to obtain desired rotational alignment.

Once desired rotational alignment is achieved, then automated scale and offset determination may be performed as shown in block 1904. Automated scale and offset determination may determine the errors in x-position, y-position, x-scaling, and y-scaling. The image registration values may be written to flash memory, as indicated in block 1905. A visual blending check may be performed by the operator, if desired, as indicated in block 1906. The results, e.g., the x-position and y-position offsets and the x-scale factor and y-scale factor may be stored for later use by a system using the aligned visible light camera 202 and infrared camera 203 of the bezel 200, as indicated in block 1907.

The operator may remove the bezel 200 from the boresight alignment station 100, as indicated in block 1908. The bezel 200 may be removed from the boresight alignment station 100 by releasing the clamps 902 and 903 of the bezel mount 403.

Figure 20:
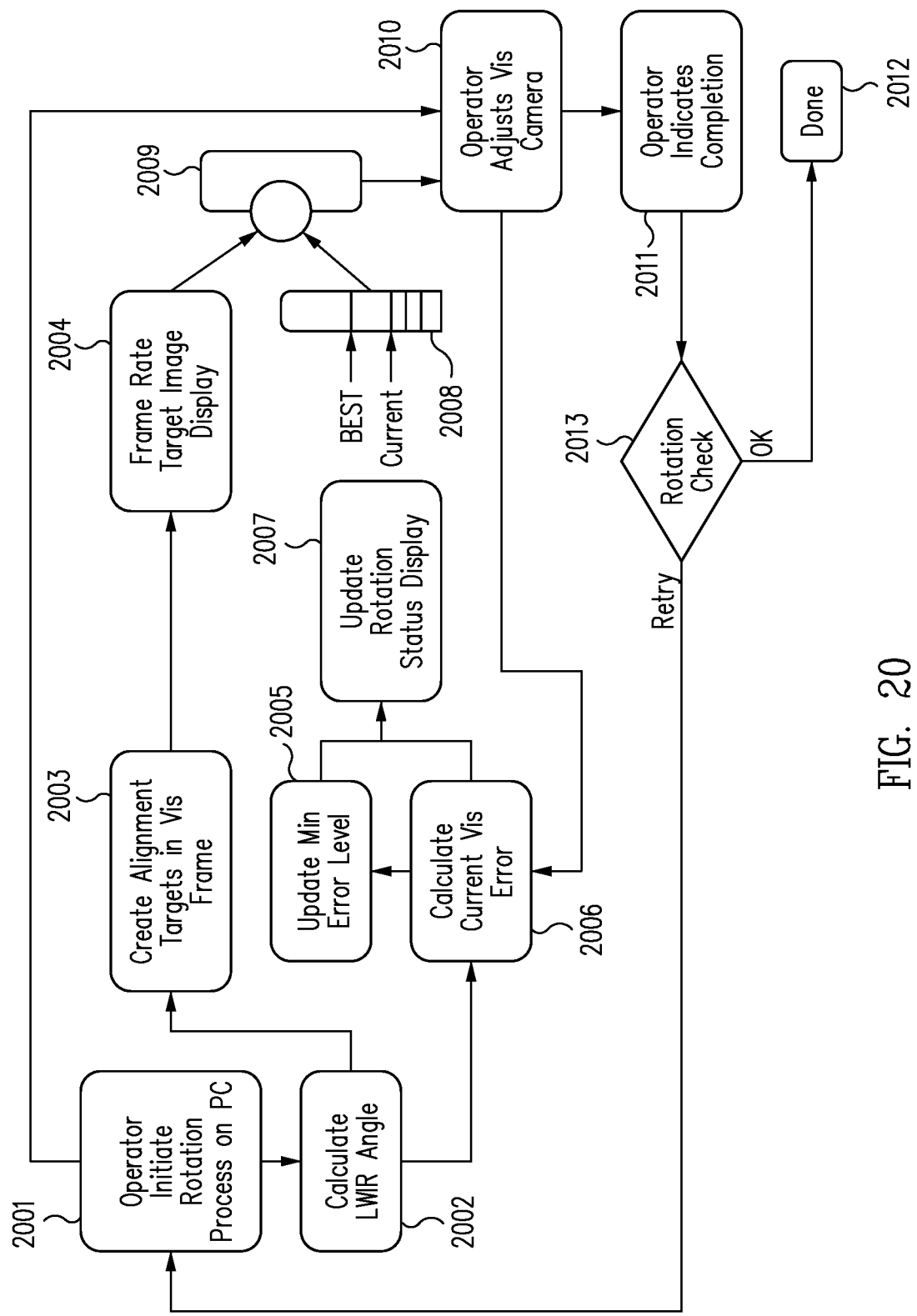
FIG. 20 shows a flowchart illustrating a rotational alignment process, in accordance with an embodiment of the invention.

FIG. 20 shows a flowchart illustrating a rotational alignment process, in accordance with an embodiment of the invention. An operator may initiate the rotational alignment process on the computer 106, as indicated in block 2001. The computer 106 may use calculated values of the centroids of the targets 511-515 to calculate the rotation of the visible light camera 202 with respect to the infrared camera 203, as indicated in block 2002.

Alignment targets may be created in the visible image frame, as indicated in block 2003. The alignment targets may be visible light images of the targets 511-515 from the visible light camera 202 and infrared images of the targets 511-515 from the infrared camera 203.

The alignment targets may facilitate the mechanical alignment of the visible light camera 202. For example, the targets may indicate the amount by which the visible light camera 202 must be rotated to achieve desired alignment thereof with respect to the infrared camera 203. During the rotational alignment process, the visible light target image (from the visible light camera 202) and/or the infrared image (from the infrared camera 203) may be displayed at the desired frame rate, as indicated in block 2004.

The visual display of the targets 511-515 and the visual display of the current alignment error may both be provided, e.g., updated, at the frame rate to enhance the operators ability to quickly perform and/or monitor the boresight alignment process.

The current rotational error of the visible light image with respect to the infrared image may be calculated, as indicated in block 2006. The minimum error level may be updated, as indicated in block 2005.

The rotational status 2008 may be updated and shown on the monitor 109, as indicated in block 2007. The rotational status 2008 may show indicia representative of the best rotational alignment achievable and the current rotational alignment, so as to facilitate manual adjustment of the rotational alignment.

An operator 2009 may view a display on the monitor 109 that is indicative of the amount of misalignment of the visible light camera 202 with respect to the infrared camera 203. For example, the operator 2009 may view the infrared image of the targets 511-515 and the visible light image of the targets, to observe any rotational offset there between. As a further example, the operator 2009 may view the rotational status 2008 to observe rotational status indicia. The operator 2009 may use any combination of the imaged targets 511-515 and the status indicia 2008 to adjust the rotation of the visible light camera 203, for example, as indicate in block 2010.

The rotational alignment process may be repeated as necessary to obtain the desire rotational alignment, as indicated in block 2013. Once the desired rotational alignment is obtained, the operator 2009 may indicate to the computer 106 that rotational alignment has been completed, as indicated in block 2011. The rotational alignment process is then done, as indicated in block 2012.

Figure 21:
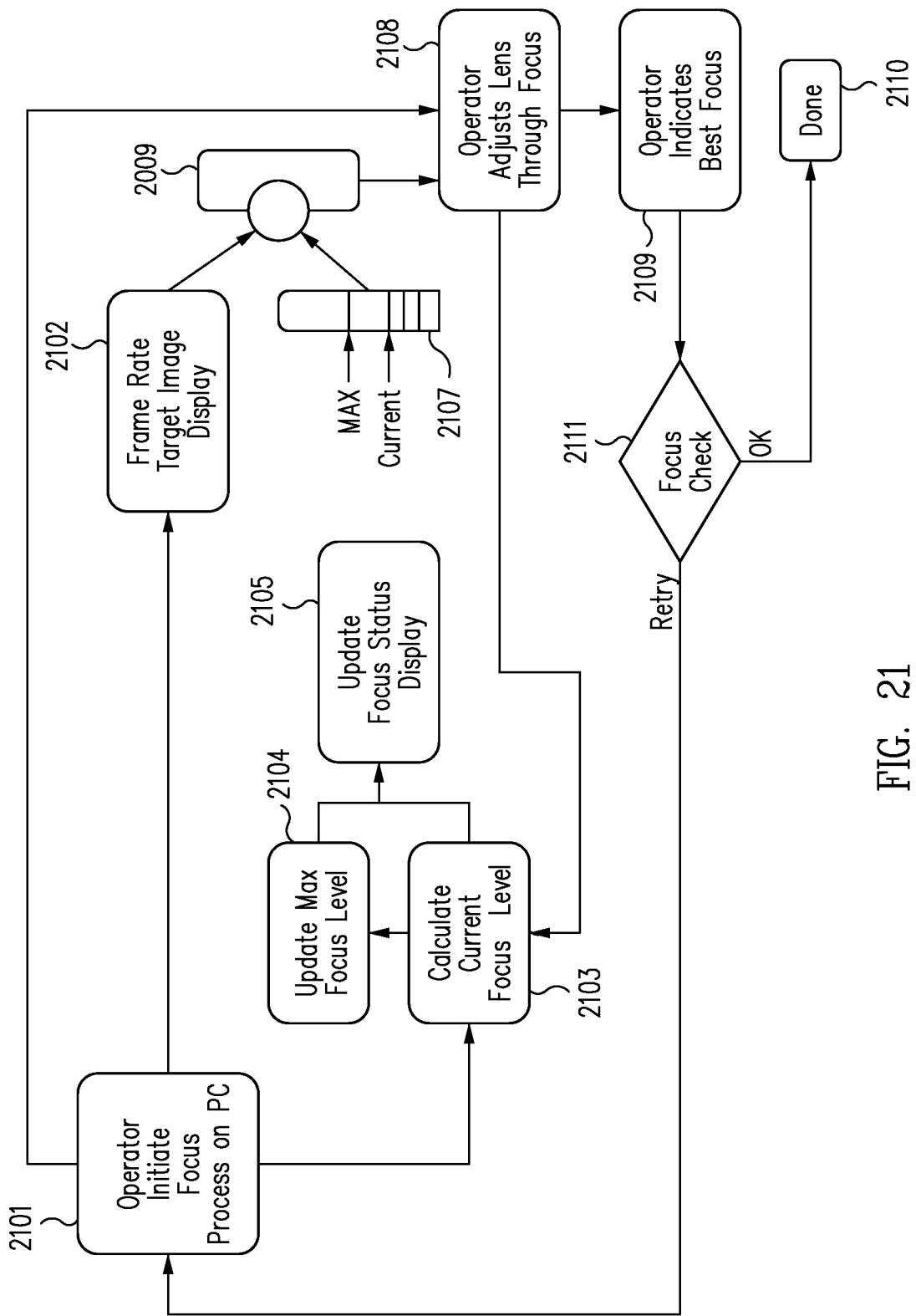
FIG. 21 shows a flowchart illustrating a focus process, in accordance with an embodiment of the invention.

FIG. 21 shows a flowchart illustrating a focus process, in accordance with an embodiment of the invention. The focus process may be initiated on the computer 106 by the operator as indicated in block 2101. During the focus process, a display, such as the monitor 109, may provide an indication of the current focus may be observed, as indicated in block 2102. The current focus level may be calculated, as indicated in 2103. The current focus level may be compared to an updated maximum focus level, as indicated in block 2104.

The focus status 2105 may be updated and shown on the monitor 109, as indicated in block 2105. The focus status 2105 may show indicia representative of the best rotational alignment achievable and the current rotational alignment, so as to facilitate manual adjustment of the focus.

The operator 2009 may view a display on the monitor 109 that is indicative of the amount by which the focus of the visible light camera 202 or the infrared camera 203 needs to be improved. For example, the operator 2009 may view the infrared image of the targets 511-515 or the visible light image of the targets, to observe the focus thereof. As a further example, the operator 2009 may view the focus status 2008 to observe focus status indicia. The focus status indicia may be any desired text or graphical representation of the focus. The operator 2009 may use any combination of the imaged targets 511-515 and the focus indicia to adjust the focus of the visible light camera 202 and or the infrared camera 203, as indicate in block 2108.

The focus process may be repeated as necessary to obtain the desired focus of the visible light camera 202 and/or the infrared camera 203, as indicated in block 2111. Once desired focus is obtained, the operator 2009 may indicate to the computer 106 that best focus has been achieved, as indicated in block 2109. The focus process is then done, as indicated in block 2110.

Although the embodiments discussed above and shown in the figures facilitates the alignment of two cameras, such is by way of illustration only and not by way of limitation. Embodiments may facilitate the alignment of any number of cameras with respect to one another. For example, two, three, four, or more cameras may be aligned with respect to one another.

The cameras may all be of one type or may be a combination of different types. The cameras may be any type of cameras or any combination of types of cameras. For example, the cameras may be any combination of visible light cameras, infrared cameras, and ultraviolet cameras.

The openings 801-805 in the baffles 501-503 need not necessarily comprises four openings 801-804 that define crosses proximate four corners of the baffles 501-501 and one round opening 805 proximate the center of each of the baffles 501-503. Such configurations of the openings 801-805 are by way of example only, and not by way of limitation. Any desired number of openings may be used. For example, two, three, four, five, six, or more openings may be used. Each of the openings 801-805 may have any desired shape. For example, the openings 801-805 may be round, square, triangular, linear, or any combination thereof. The openings 801-805 may be disposed anywhere on the baffles 501-503. For example, the openings 801-805 may be generally centrally located on the baffles 501-503, generally peripherally located thereon, or any desired combination of centrally located and peripherally located.

Data obtained from the alignment process may be associated with the bezel 200 and may be stored with the bezel 200 or may be stored separate from the bezel 200. This data may include alignment correction factors that may be used to electronically align or partially align the visible light camera 202 with respect to the infrared camera 203. For example, the data may include an x-position offset, a y-position offset, an x scale factor, a y scale factor, and/or a rotation offset.

The data may be stored electronically in the bezel 200. For example, the data may be stored in a read only memory (such as an electronically erasable programmable read only memory (EEPROM) or flash memory) of the bezel 200. The system that uses the images from the visible light camera 202 and the infrared camera 203 may query the storage medium of the bezel to obtain the data and thus facilitate electronic alignment of the images of the visible light camera 202 and the infrared camera 203. Alternatively, data may be used to align the images of the visible light camera 202 and the infrared camera 203 within the bezel such that an aligned combined frame is provided by the bezel 200.

The data may be stored electronically outside of the bezel 200. For example, the data may be stored in a read only memory, a flash memory, a magnetic disk, or an optical disk that may be used to transfer the data to the system that processes and/or uses the images from the visible light camera 202 and the infrared camera 203.

The data may be stored in written form on paper and input by hand or scanned into the system that processes and/or uses the images from the visible light camera 202 and the infrared camera 203. Such written data may be text, bar code, or any other type of written data. Thus, a bar code sticker may be attached to the bezel 200 and the bar code sticker may have the data printed thereon in a format that is readily machine readable.

As used herein, the term "bezel" may be defined to include any structure for mounting a plurality of cameras. The bezel may mount any number of cameras and any type or types of cameras.

As used herein, the term "light" may be defined to include any type or wavelength of electromagnetic radiation. For example, the term light may refer to visible, infrared, ultraviolet, or any other electromagnetic radiation.

The boresight alignment station 100 may use collimator 402, a plurality of targets 511-515 that operate simultaneously in two different ranges of wavelengths or spectral bands, and closed-loop software analytics to provide automatic and real time feedback indicative of the corrective actions that are required to achieve the desired level of camera image alignment.

The boresight alignment station 100 may facilitate the quick and accurate alignment of the pixels of one camera with respect to the pixels of another camera. The boresight alignment station may facilitate high volume production of a camera system that uses plural aligned cameras. The boresight alignment station facilitates, at least to some degree, automation of the boresight alignment process. The boresight alignment station substantially reduces the amount of time required for the alignment process and similarly reduces the cost associated therewith.

While the invention has been described in detail in connection with only a limited number of embodiments, it should be readily understood that the invention is not limited to such disclosed embodiments. Rather, the invention may be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A boresight alignment system comprising:
a mount for the boresight alignment system that is configured to facilitate attachment of a bezel thereto, the bezel having a plurality of cameras;
a plurality of targets within the boresight alignment system, each of the targets configured to provide light for at least two of the cameras, each of the two cameras operating within a range of wavelengths including a long wavelength infrared range of wavelengths; and
at least one baffle of the boresight alignment system that is disposed optically between the mount and the targets to inhibit stray light from being incident upon the cameras.

2. The system of claim 1, wherein each of the targets are configured to provide infrared energy and visible light.

3. The system of claim 1, wherein the targets are individually heatable to control an amount of infrared energy provided thereby.

4. The system of claim 1, further comprising a light source configured to reflect light off of the targets.

5. The system of claim 3, further comprising a light source configured to reflect light off of the targets, wherein the light source provides visible light, and wherein the targets are individually heatable by a resistive heater.

6. The system of claim 1, wherein the targets comprise four outer targets and one center target.

7. The system of claim 6, wherein the at least one baffle comprises a plurality of baffles and each of the baffles comprises four cross-shaped openings corresponding to the outer targets and one round opening corresponding to the center target.

8. The system of claim 6, further comprising a generally toroidal fluorescent light source configured to reflect light off of the targets and configured to facilitate imaging of the center target through an opening in the toroidal fluorescent light source.

9. The system of claim 1, further comprising a collimator configured to collimate light from the targets.

10. The system of claim 1, wherein the mount further comprises a plurality of clamps for attaching the bezel to a surface of the mount.

11. The system of claim 1, further comprising a computer configured to use images of the targets provided by the cameras to facilitate manual alignment of rotation of the cameras.

12. The system of claim 1, further comprising:
a computer configured to use images of the targets provided by the cameras to facilitate automated alignment of the images;
the bezel having the plurality of cameras; and
wherein the bezel is configured to be removed from the mount and mounted in a camera assembly in which aligned images from the cameras are combined to provide blended images.

13. A target assembly for a boresight alignment system, the target assembly comprising:
a plurality of targets configured to be disposed within the boresight alignment system, wherein each of the targets is configured to provide light for two cameras operating within two different ranges of wavelengths by radiating light of one wavelength in a long wavelength infrared region and by reflecting light of another wavelength.

14. The target assembly as recited in claim 13, wherein each of the targets comprises a heater and each heater is individually controllable to control an amount of long wavelength infrared energy radiated by each target.

15. The target assembly as recited in claim 13, wherein each of the targets comprises a reflective surface that is configured to reflect light toward the cameras.

16. The target assembly as recited in claim 15, wherein the reflective surfaces are configured to reflect visible light.

17. A method, comprising:
attaching a bezel to a mount of a boresight alignment system, the bezel containing a first camera and a second camera;
heating a plurality of targets to radiate long wavelength infrared radiation therefrom, the long wavelength infrared radiation being sensed by the first camera;
illuminating the targets with a light source, light reflected from the targets being sensed by the second camera;
inhibiting stray light from being incident upon the first camera and the second camera with at least one baffle; and
aligning images of the first camera and the second camera such that corresponding pixels of the first camera and the second camera are aligned to sense the same targets.

18. The method as recited in claim 17, further comprising individually varying an amount by which the targets are heated such that each of the targets appears to have substantially a same brightness to the first camera.

19. The method as recited in claim 17, further comprising varying an amount of visible light provided by the light source to vary an amount of visible light reflected by the targets.

20. The method as recited in claim 17, further comprising automatically sensing misalignment of an image of the first camera with respect to an image of the second camera and automatically aligning the image of the first camera with respect to the image of the second camera.

21. The method as recited in claim 17, further comprising:
storing offsets used for the aligning;
removing the bezel containing the first camera and the second camera from the mount;
installing the bezel containing the first camera and the second camera in a camera system; and
providing blended images for the camera system from the first and second cameras using the stored offsets.

* * * * *